(12) United States Patent
Zheng et al.

(10) Patent No.: US 11,136,884 B2
(45) Date of Patent: Oct. 5, 2021

(54) WELL CONSTRUCTION USING DOWNHOLE COMMUNICATION AND/OR DATA

(71) Applicant: Schlumberger Technology Corporation, Sugar Land, TX (US)

(72) Inventors: Shunfeng Zheng, Katy, TX (US); Benjamin Peter Jeffryes, Histon (GB); Mochammad Faisal Wingky, Garches (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/483,164

(22) PCT Filed: Feb. 2, 2017

(86) PCT No.: PCT/IB2017/000212
§ 371 (c)(1),
(2) Date: Aug. 2, 2019

(87) PCT Pub. No.: WO2018/142173
PCT Pub. Date: Aug. 9, 2018

(65) Prior Publication Data
US 2020/0003046 A1    Jan. 2, 2020

(51) Int. Cl.
*G01V 3/00* (2006.01)
*E21B 47/12* (2012.01)
(Continued)

(52) U.S. Cl.
CPC .............. *E21B 47/12* (2013.01); *E21B 44/02* (2013.01); *H04L 65/80* (2013.01); *H04L 67/125* (2013.01)

(58) Field of Classification Search
CPC . G01V 3/12; G01V 3/083; G01V 3/38; G01V 3/28; G01V 2210/6163
(Continued)

(56) References Cited

U.S. PATENT DOCUMENTS 5,995,449 A * 11/1999 Green ..................... E21B 47/18
                                                                  367/83
6,944,547 B2    9/2005 Womer et al.
(Continued)

FOREIGN PATENT DOCUMENTS

WO    2004090285 A1    10/2004
WO    2009058635 A2    5/2009
(Continued)

*Primary Examiner* — Walter L Lindsay, Jr.
*Assistant Examiner* — Frederick Wenderoth
(74) *Attorney, Agent, or Firm* — Alec J. McGinn

(57) ABSTRACT

Apparatus and methods pertaining to a processing system operable to determine a change to an operation of a well construction system based on an indication of a quality of transmitted communication between downhole equipment of the well construction system in a wellbore and surface communication equipment of the well construction system transmitted during the operation, a projected effect of the operation on future communication between the downhole equipment and the surface communication equipment, downhole data related to one or more conditions in the wellbore, or a combination thereof. The processing system is operable to cause the change to the operation of the well construction system to be implemented.

20 Claims, 7 Drawing Sheets

(51) Int. Cl.
*E21B 44/02* (2006.01)
*H04L 29/06* (2006.01)
*H04L 29/08* (2006.01)

(58) Field of Classification Search
USPC .......................................................... 324/323
See application file for complete search history.

(56) References Cited

U.S. PATENT DOCUMENTS

| | | |
|---|---|---|
| 8,196,678 B2 | 6/2012 | Jeffryes |
| 10,082,942 B2 | 9/2018 | Jarrot et al. |
| 2005/0046591 A1 | 3/2005 | Pacault et al. |
| 2006/0001549 A1 | 1/2006 | Shah et al. |
| 2008/0110612 A1* | 5/2008 | Prinz ................... F42C 15/32 166/55.2 |
| 2009/0177404 A1 | 7/2009 | Hartmann et al. |
| 2010/0161227 A1 | 6/2010 | Deere |
| 2011/0280104 A1 | 11/2011 | McClung |
| 2012/0290206 A1 | 11/2012 | Hartmann et al. |
| 2013/0000981 A1 | 1/2013 | Grimmer et al. |
| 2014/0240140 A1 | 8/2014 | Switzer et al. |
| 2014/0326505 A1 | 11/2014 | Davis et al. |
| 2014/0338900 A1* | 11/2014 | Jones ..................... E21B 49/00 166/264 |
| 2015/0053483 A1* | 2/2015 | Mebane, III .......... E21B 44/005 175/26 |
| 2015/0107901 A1 | 4/2015 | Eriksson et al. |
| 2015/0139615 A1 | 5/2015 | Hill |
| 2015/0240619 A1 | 8/2015 | Frosell |
| 2015/0337652 A1 | 11/2015 | Rodney |
| 2016/0003035 A1 | 1/2016 | Logan et al. |
| 2016/0090800 A1 | 3/2016 | Jeffryes |
| 2016/0194950 A1 | 7/2016 | Zheng et al. |
| 2016/0230484 A1 | 8/2016 | Johnson et al. |

FOREIGN PATENT DOCUMENTS

| | | |
|---|---|---|
| WO | 2009089150 A2 | 7/2009 |
| WO | 2009132281 A1 | 10/2009 |

* cited by examiner

WELL CONSTRUCTION USING DOWNHOLE COMMUNICATION AND/OR DATA

BACKGROUND OF THE DISCLOSURE

In the drilling of oil and gas wells, drilling rigs are used to create a well by drilling a wellbore into a formation to reach oil and gas deposits (e.g., hydrocarbon deposits). During the drilling process, as the depth of the wellbore increases, so does the length and weight of the drillstring. A drillstring may include sections of drill pipe, a bottom hole assembly, and other tools for creating a well. The length of the drillstring may be increased by adding additional sections of drill pipe as the depth of the wellbore increases. Various components of a drilling rig can be used to advance the drillstring into the formation.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a processing system that includes a processor and a memory including computer program code. The processing system is operable to determine a change to an operation of a well construction system based on an indication of a quality of transmitted communication between downhole equipment of the well construction system in a wellbore and surface communication equipment of the well construction system transmitted during the operation, a projected effect of the operation on future communication between the downhole equipment and the surface communication equipment, downhole data related to one or more conditions in the wellbore, or a combination thereof. The processing system is also operable to cause the change to the operation of the well construction system to be implemented.

The present disclosure also introduces a method including operating a processing system having a processor and a memory including computer program code. Operating the processing system includes determining a change to an operation of at least some of surface equipment of the well construction system based on: (i) an indication of a quality of a transmitted communication between downhole equipment of the well construction system in a wellbore and surface communication equipment of the well construction system transmitted during the operation; (ii) a projected effect of the operation on future communication between the downhole equipment and the surface communication equipment; (iii) downhole data related to one or more conditions in the wellbore; or (iv) a combination thereof. Operating the processing system also includes causing the change to the operation to be implemented.

The present disclosure also introduces an apparatus including a processing system having a processor and a memory including computer program code, the processing system being operable to analyze a communication between downhole equipment and surface equipment of a well construction system to obtain an indication of a quality of the communication, determine a change to an operation of the well construction system based on the indication of the quality of the communication, and cause the change to the operation of the well construction system to be implemented.

The present disclosure also introduces a method including operating a processing system having a processor and a memory including computer program code. Operating the processing system includes analyzing a communication between downhole equipment and surface equipment of a well construction system to obtain an indication of a quality of the communication, determining a change to an operation of the well construction system based on the indication of the quality of the communication, and causing the change to the operation of the well construction system to be implemented.

The present disclosure also introduces an apparatus including a processing system having a processor and a memory including computer program code, the processing system being operable to determine a projected effect on a future communication based on a future sequence of an operation of a well construction system. The future communication is between downhole equipment and surface equipment of the well construction system. The processing system is also operable to determine a change to the operation of the well construction system based on the projected effect, and cause the change to the operation of the well construction system to be implemented.

The present disclosure also introduces a method including operating a processing system having a processor and a memory including computer program code. Operating the processing system includes determining a projected effect on a future communication based on a future sequence of an operation of a well construction system. The future communication is between downhole equipment and surface equipment of the well construction system. Operating the processing system also includes determining a change to the operation of the well construction system based on the projected effect, and causing the change to the operation of the well construction system to be implemented.

The present disclosure also introduces an apparatus including a processing system having a processor and a memory including computer program code, the processing system being operable to determine a change to an operation of a well construction system based on downhole data relating to one or more conditions in a wellbore at a well site, and cause the change to the operation of the well construction system to be implemented.

The present disclosure also introduces a method including operating a processing system having a processor and a memory including computer program code. Operating the processing system includes determining a change to an operation of a well construction system based on downhole data relating to one or more conditions in a wellbore at a well site, and causing the change to the operation of the well construction system to be implemented.

The present disclosure also introduces an apparatus including equipment of a well construction apparatus, one or more equipment controllers operable to control the equipment, and a processing system including a processor and a memory including computer program code. The one or more equipment controllers and the processing system are communicatively coupled to a network. The processing system is operable to identify an operation of the equipment, determine a change to the identified operation of the equipment based on downhole data relating to one or more conditions in a wellbore formed by the well construction apparatus, and cause the change to the identified operation to be implemented.

The present disclosure also introduces a method including operating a processing system having a processor and a memory including computer program code, the processing system being communicatively coupled to a network. Operating the processing system includes identifying an operation of equipment of a well construction apparatus, and determining a change to the identified operation of the equipment based on downhole data relating to one or more conditions in a wellbore formed by the well construction apparatus. The method also includes operating the equipment of the well construction apparatus based on the change. Operating the equipment includes controlling the equipment using one or more equipment controllers communicatively coupled to the network.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
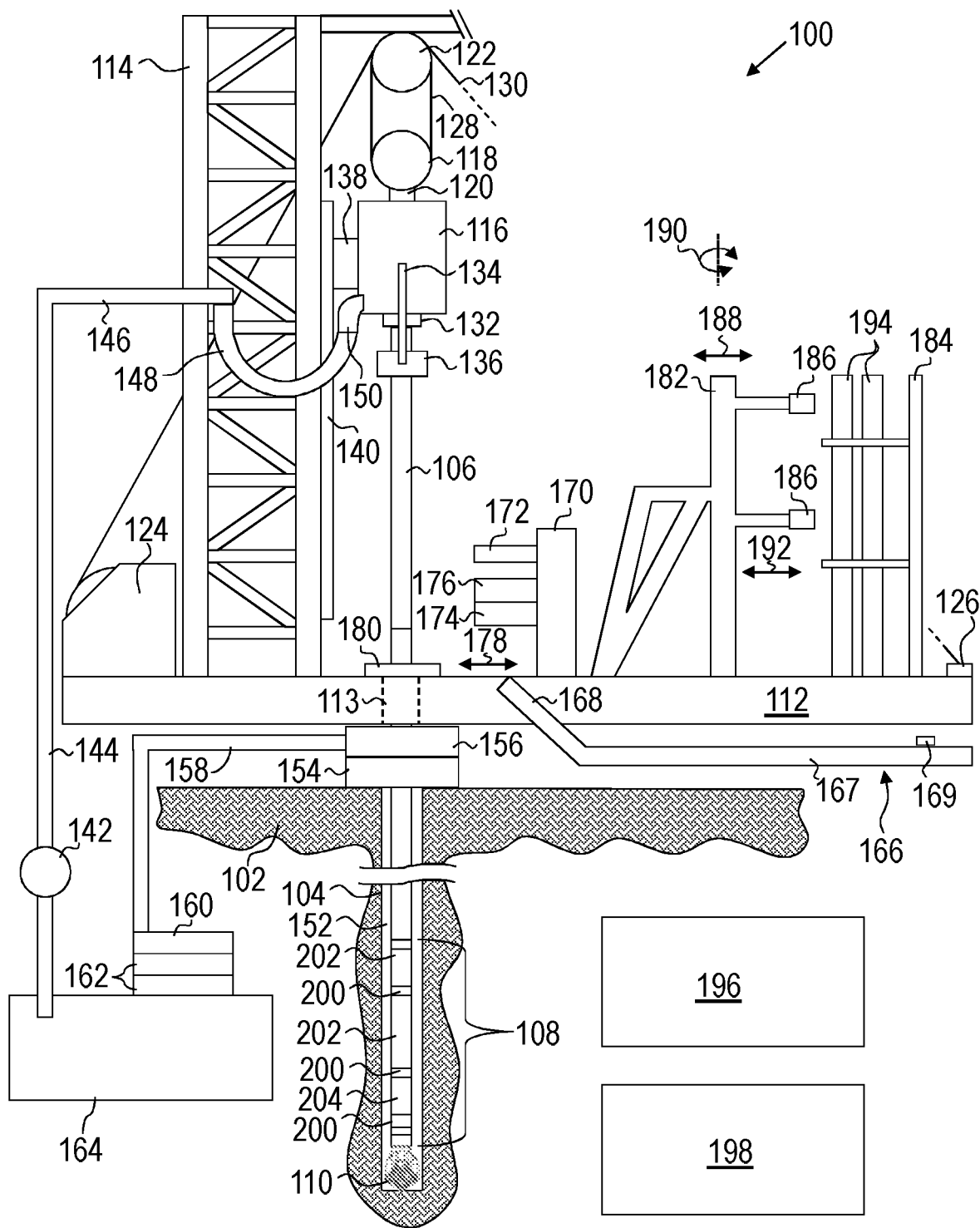
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Systems and methods and/or processes according to one or more aspects of the present disclosure may be used or performed in connection with well construction operations, such as at a well site for constructing a well to obtain hydrocarbons (e.g., oil and/or gas) from a formation. For example, some aspects may be described in the context of drilling a wellbore in the oil and gas industry. One or more aspects of the present disclosure may be applied in other contexts, such as for any construction operations.

One or more aspects of the present disclosure may permit automated, real-time analysis of current and/or projected downhole conditions in operating a well construction process, which may further analyze surface conditions in some example implementations. One or more aspects of the present disclosure may also permit automated, real-time alteration of the operation of the well construction process based on the analysis. Based on such analysis and alteration, communications made between a surface acquisition module and downhole equipment may be made more efficiently, and/or operations of the well construction process may be performed more effectively and/or efficiently.

In some example implementations, a quality of a communication between downhole equipment and a surface acquisition module may be determined, and a change in the operation of the well construction process may be made to improve a quality of a subsequent communication between the downhole equipment and the surface acquisition module. In some example implementations, an operation of a job plan and/or command can be analyzed to determine and/or project an effect on communications between downhole equipment and a surface acquisition module, and a change in the operation may be made to reduce and/or prevent the effect on the communications. In some example implementations, downhole data relating to conditions in the wellbore (e.g., whether obtained and/or originating from downhole equipment or surface equipment), with or without other surface data, may be used to determine how to more effectively and/or efficiently operate the well construction process, and a change in the operation of the well construction process may be made to implement the more effective and/or efficient operation. Various aspects disclosed herein may be used together or independent from other aspects disclosed herein, and various aspects may be modified. Such use of aspects and modifications are within the scope of the present disclosure.

FIG. 1 is a schematic view of at least a portion of an example implementation of a well construction system 100 operable to drill a wellbore 104 into one or more subsurface formations 102 at a well site in accordance with one or more aspects of the present disclosure. A drillstring 106 penetrates the wellbore 104 and includes a bottom hole assembly (BHA) 108 that comprises or is mechanically and hydraulically coupled to a drill bit 110. The well construction system 100 includes a mast 114 (at least a portion of which is depicted in FIG. 1) extending from a rig floor 112 that is erected over the wellbore 104. A top drive 116 is suspended from the mast 114 and is mechanically coupled to the drillstring 106. The top drive 116 provides a rotational force (e.g., torque) to drive rotational movement of the drillstring 106, such as to advance the drillstring 106 into the one or more subsurface formations 102 to form the wellbore 104.

The top drive 116 is suspended from the mast 114 via hoisting equipment. The hoisting equipment includes a traveling block 118 with a hook 120, a crown block 122, a drawworks 124, a deadline anchor 126, a supply reel (not depicted), and a drill line 128 with a deadline 130 (a portion of which is shown in phantom). The hook 120 of the traveling block 118 mechanically couples with the top drive 116, although other means for coupling the traveling block 118 with the top drive 116 are also within the scope of the present disclosure. The crown block 122 is suspended from, coupled with, and/or otherwise supported by the mast 114.

The drawworks 124 and the deadline anchor 126 are on and supported by the rig floor 112. The drill line 128 is supplied from the supply reel through the deadline anchor 126. The drill line 128 may be wrapped around and clamped at the deadline anchor 126 such that the drill line 128 that extends from the deadline anchor 126 to the crown block 122 is stationary during normal drilling operations, and hence, the portion of the drill line 128 that extends from the deadline anchor 126 to the crown block 122 is referred to as the deadline 130.

The crown block 122 and traveling block 118 comprise one or more pulleys or sheaves. The drill line 128 is reeved around the pulleys or sheaves of the crown block 122 and the traveling block 118. The drill line 128 extends from the crown block 122 to the drawworks 124. The drawworks 124 can comprise a drum, a prime mover (e.g., an engine or motor), a control system, and one or more brakes, such as a mechanical brake (e.g., a disk brake), an electrodynamic brake, and/or the like. The prime mover of the drawworks 124 drives the drum to rotate and reel in drill line 128, which in turn causes the traveling block 118 and top drive 116 to move upward. The drawworks 124 can reel out drill line 128 by a controlled rotation of the drum using the prime mover and control system, and/or by disengaging the prime mover (such as with a clutch) and disengaging and/or operating one or more brakes to control the release of the drill line 128. By unreeling drill line 128 from the drawworks 124, the traveling block 118 and top drive 116 may move downward.

Implementations within the scope of the present disclosure include land-based rigs, as depicted in FIG. 1, as well as offshore implementations. In offshore implementations, the hoisting equipment may also include a motion or heave compensator between the mast 114 and the crown block 122 and/or between the traveling block 118 and the hook 120, for example.

The top drive 116 includes a drive shaft 132, a pipe handling assembly 134 with an elevator 136, and various other components not shown in FIG. 1, such as a prime mover and a grabber. The drillstring 106 is mechanically coupled to the drive shaft 132 (e.g., with or without a sub saver between the drillstring 106 and the drive shaft 132). The prime mover drives the drive shaft 132, such as through a gearbox or transmission, to rotate the drive shaft 132 and, therefore, the drillstring 106, such as to advance the drillstring 106 into the one or more subsurface formations 102 to form the wellbore 104. The pipe handling assembly 134 and elevator 136 permit the top drive 116 to handle tubulars (e.g., single, double, or triple stands of drill pipe and/or casing) that are not mechanically coupled to the drive shaft 132. The grabber includes a clamp that clamps onto a tubular when making up and/or breaking out a connection of a tubular with the drive shaft 132. A guide system (e.g., rollers, rack-and-pinion elements, and/or other mechanisms) includes a guide 140 affixed or integral to the mast 114 and portions 138 integral to or otherwise carried with the top drive 116 up and down the guide 140. The guide system may provide torque reaction, such as to prevent rotation of the top drive 116 while the prime mover is rotating the drive shaft 132. The guide system may also or instead aid in maintaining alignment of the top drive 116 with an opening 113 in the rig floor 112 through which the drillstring 106 extends.

A drilling fluid circulation system circulates oil-based mud (OBM), water-based mud (WBM), and/or other drilling fluid to the drill bit 110. A pump 142 delivers drilling fluid through, for example, a discharge line 144, a standpipe 146, and a rotary hose 148 to a port 150 of the top drive 116. The drilling fluid is then conducted through the drillstring 106 to the drill bit 110, exiting into the wellbore 104 via ports in the drill bit 110. The drilling fluid then circulates upward through an annulus 152 defined between the outside of the drillstring 106 and the wall of the wellbore 104. In this manner, the drilling fluid lubricates the drill bit 110 and carries formation cuttings up to the surface as the drilling fluid is circulated.

At the surface, the drilling fluid may be processed for recirculation. For example, the drilling fluid may flow through a blowout preventer 154 and a bell nipple 156 that diverts the drilling fluid to a return flowline 158. The return flowline 158 may direct the drilling fluid to a shale shaker 160 that removes at least large formation cuttings from the drilling fluid. The drilling fluid may then be directed to reconditioning equipment 162, such as may remove gas and/or finer formation cuttings from the drilling fluid. The reconditioning equipment 162 can include a desilter, a desander, a degasser, and/or other components.

After treatment by the reconditioning equipment 162, the drilling fluid may be conveyed to one or more mud tanks 164. Intermediate mud tanks may also be used to hold drilling fluid before and/or after the shale shaker 160 and/or various ones of the reconditioning equipment 162. The mud tank(s) 164 can include an agitator to assist in maintaining uniformity (e.g., homogeneity) of the drilling fluid contained therein. A hopper (not depicted) may be disposed in a flowline between the mud tank(s) 164 and the pump 142 to disperse an additive, such as caustic soda, in the drilling fluid.

A catwalk 166 can be used to convey tubulars from a ground level to the rig floor 112. The catwalk 166 has a horizontal portion 167 and an inclined portion 168 that extends between the horizontal portion 167 and the rig floor 112. A skate 169 may be positioned in a groove and/or other alignment means in the horizontal and inclined portions of the catwalk 166. The skate 169 can be driven along the groove by a rope, chain, belt, and/or other pulley system (not depicted), thereby pushing tubulars up the inclined portion 168 of the catwalk 166 to a position at or near the rig floor 112 for subsequent engagement by the elevator 136 of the top drive 116 and/or other pipe handling means. However, other means for transporting tubulars from the ground to the rig floor 112 are also within the scope of the present disclosure. One or more pipe racks may also adjoin the horizontal portion 167 of the catwalk 166, and may have a spinner unit and/or other means for transferring tubulars to the horizontal portion 167 of the catwalk 166 in a mechanized and/or automated manner.

An iron roughneck 170 is also disposed on the rig floor 112. The iron roughneck 170 comprises a spinning system 172 and a torque wrench comprising a lower tong 174 and an upper tong 176. The iron roughneck 170 is moveable (e.g., in a translation movement 178) to approach the drillstring 106 (e.g., for making up and/or breaking out a connection of the drillstring 106) and to move clear of the drillstring 106. The spinning system 172 applies low-torque spinning to threadedly engage or disengage a threaded connection between tubulars of the drillstring 106, and the torque wrench applies a higher torque to ultimately make up or initially break out the threaded connection.

Manual, mechanized, and/or automated slips 180 are also disposed on and/or in the rig floor 112. The drillstring 106 extends through the slips 180. In mechanized and/or automated implementations of the slips 180, the slips 180 can be actuated between open and closed positions. In the open position, the slips 180 permit advancement of the drillstring 106 through the slips 180. In the closed position, the slips 180 clamp the drillstring 106 to prevent advancement of the drillstring 106, including with sufficient force to support the weight of the drillstring 106 suspended in the wellbore 104.

To form the wellbore 104 (e.g., "make hole"), the hoisting equipment lowers the top drive 116, and thus the drillstring 106 suspended from the top drive 116, while the top drive 116 rotates the drillstring 106. During this advancement of the drillstring 106, the slips 180 are in the open position, and the iron roughneck 170 is clear of the drillstring 106. When the upper end of the tubular in the drillstring 106 that is made up to the top drive 116 nears the slips 180, the hoisting equipment ceases downward movement of the top drive 116, the top drive 116 ceases rotating the drillstring 106, and the slips 180 close to clamp the drillstring 106. The grabber of the top drive 116 clamps the upper portion of the tubular made up to the drive shaft 132. The drive shaft 132 is driven via operation of the prime mover of the top drive 116 to break out the connection between the drive shaft 132 and the drillstring 106. The grabber of the top drive 116 then releases the tubular of the drillstring 106, and the hoisting equipment raises the top drive 116 clear of the "stump" of the drillstring 106 extending upward from the slips 180.

The elevator 136 of the top drive 116 is then pivoted away from the drillstring 106 towards another tubular extending up through the rig floor 112 via operation of the catwalk 166. The elevator 136 and the hoisting mechanism are then operated to grasp the additional tubular with the elevator 136. The hoisting equipment then raises the additional tubular, and the elevator 136 and the hoisting equipment are then operated to align and lower the bottom end of the additional tubular to proximate the upper end of the stump.

The iron roughneck 170 is moved 178 toward the drillstring 106, and the lower tong 174 clamps onto the stump of the drillstring 106. The spinning system 172 then rotates the suspended tubular to engage a threaded (e.g., male) connector with a threaded (e.g., female) connector at the top end of the stump. Such spinning continues until achieving a predetermined torque, number of spins, vertical displacement of the additional tubular relative to the stump, and/or other operational parameters. The upper tong 176 then clamps onto and rotates the additional tubular with a higher torque sufficient to complete making up the connection with the stump. In this manner, the additional tubular becomes part of the drillstring 106. The iron roughneck 170 then releases the drillstring 106 and is moved 178 clear of the drillstring 106.

The grabber of the top drive 116 then grasps the drillstring 106 proximate the upper end of the drillstring 106. The drive shaft 132 is moved into contact with the upper end of the drillstring 106 and is rotated via operation of the prime mover to make up a connection between the drillstring 106 and the drive shaft 132. The grabber then releases the drillstring 106, and the slips 180 are moved into the open position. Drilling may then resume.

FIG. 1 also depicts a pipe handling manipulator (PHM) 182 and a fingerboard 184 disposed on the rig floor 112, although other implementations within the scope of the present disclosure may include one or both of the PHM 182 and the fingerboard 184 located elsewhere or excluded. The fingerboard 184 provides storage (e.g., temporary storage) of tubulars 194, such that the PHM 182 can be operated to transfer the tubulars 194 from the fingerboard 184 for inclusion in the drillstring 106 during drilling or tripping-in operations, instead of (or in addition to) from the catwalk 166, and similarly for transferring tubulars 194 removed from the drillstring 106 to the fingerboard 184 during tripping-out operations.

The PHM 182 includes arms and clamps 186 collectively operable for grasping and clamping onto a tubular 194 while the PHM 182 transfers the tubular 194 to and from the drillstring 106, the fingerboard 184, and the catwalk 166. The PHM 182 is movable in at least one translation direction 188 and/or a rotational direction 190 around an axis of the PHM 182. The arms of the PHM 182 can extend and retract along direction 192.

The tubulars 194 conveyed to the rig floor 112 via the catwalk 166 (such as for subsequent transfer by the elevator 136 and/or the PHM 182 to the drillstring 106 and/or the fingerboard 184) may be single joints and/or double- or triple-joint stands assembled prior to being fed onto the catwalk 166. In other implementations, the catwalk 166 may include means for making/breaking the multi-joint stands.

The multi-joint stands may also be made up and/or broken out via cooperative operation of two or more of the top drive 116, the drawworks 124, the elevator 136, the catwalk 166, the iron roughneck 170, the slips 180, and the PHM 182. For example, the catwalk 166 may position a first joint (drill pipe, casing, etc.) to extend above the rig floor 112 or another orientation where the joint can be grasped by the elevator 136. The top drive 116, the drawworks 124, and the elevator 136 may then cooperatively transfer the first joint into the wellbore 104, where the slips 180 may retain the first joint. The catwalk 166 may then position a second joint that will be made up with the first joint. The top drive 116, the drawworks 124, and the elevator 136 may then cooperatively transfer the second joint to proximate the upper end of the first joint extending up from the slips 180. The iron roughneck 170 may then make up the first and second joints to form a double stand. The top drive 116, the drawworks 124, the elevator 136, and the slips 180 may then cooperatively move the double stand deeper into the wellbore 104, and the slips 180 may retain the double stand such that an upper end of the second joint extends upward. If the contemplated drilling, casing, or other operations are to utilize triple stands, the catwalk 166 may then position a third joint to extend above the rig floor 112, and the top drive 116, the drawworks 124, and the elevator 136 may then cooperatively transfer the third joint to proximate the upper end of the second joint extending up from the slips 180. The iron roughneck 170 may then make up the second and third joints to form a triple stand. The top drive 116 (or the elevator 136) and the drawworks 124 may then cooperatively lift the double or triple stand out of the wellbore 104. The PHM 182 may then transfer the stand from the top drive 116 (or the elevator 136) to the fingerboard 184, where the stand may be stored until retrieved by the PHM 182 for the drilling, casing, and/or other operations. This process of assembling stands may generally be performed in reverse to disassemble the stands.

A power distribution center 196 is also at the well site. The power distribution center 196 includes one or more generators, one or more AC-to-DC power converters, one or more DC-to-AC power inverters, one or more hydraulic systems, one or more pneumatic systems, the like, or a combination thereof. The power distribution center 196 can distribute AC and/or DC electrical power to various motors, pumps, or the like that are throughout the well construction system 100. Similarly, the power distribution center 196 can distribute pneumatic and/or hydraulic power throughout the well construction system 100. Components of the power distribution center 196 can be centralized in the well construction system 100 or can be distributed throughout the well construction system 100.

A control center 198 is also at the well site. The control center 198 houses one or more processing systems of a network of the well construction system 100. Details of the network of the well construction system 100 are described below. Generally, various equipment of the well construction system 100, such as the drilling fluid circulation system, the hoisting equipment, the top drive 116, the PHM 182, the catwalk 166, etc., can have various sensors and controllers to monitor and control the operations of that equipment. Additionally, the control center 198 can receive information regarding the formation and/or downhole conditions from modules and/or components of the BHA 108.

The BHA 108 can comprise various components with various capabilities, such as measuring, processing, and storing information. A telemetry device can be in the BHA 108 to enable communications with surface equipment (which includes a surface acquisition module that receives communications from the telemetry device), such as at the control center 198. The BHA 108 shown in FIG. 1 is depicted as having a modular construction with specific components in certain modules. However, the BHA 108 may be unitary or select portions thereof may be modular. The modules and/or the components therein may be positioned in a variety of configurations throughout the BHA 108. The BHA 108 may comprise a measurement while drilling (MWD) module 200 that may include tools operable to measure wellbore trajectory, wellbore temperature, wellbore pressure, and/or other example properties. The BHA 108 may comprise a sampling while drilling (SWD) system comprising a sample module 202 for communicating a formation fluid through the BHA 108 and obtaining a sample of the formation fluid. The SWD system may comprise gauges, sensor, monitors and/or other devices that may also be utilized for downhole sampling and/or testing of a formation fluid. The BHA 108 may comprise a logging while drilling (LWD) module 204 that may include tools operable to measure formation parameters and/or fluid properties, such as resistivity, porosity, permeability, sonic velocity, optical density, pressure, temperature, and/or other example properties.

A person having ordinary skill in the art will readily understand that a well construction system may include more or fewer equipment than as described herein and/or depicted in the figures. Additionally, various equipment and/or systems of the example implementation of the well construction system 100 depicted in FIG. 1 may include more or fewer equipment. For example, various engines, motors, hydraulics, actuators, valves, or the like that were not described above and/or depicted in FIG. 1 may be included in other implementations of equipment and/or systems also within the scope of the present disclosure.

Additionally, the well construction system 100 of FIG. 1 may be implemented as a land-based rig or on an offshore rig. One or more aspects of the well construction system 100 of FIG. 1 may be incorporated in and/or omitted from a land-based rig or an offshore rig. Such modifications are within the scope of the present disclosure.

Even further, one or more equipment and/or systems of the well construction system 100 of FIG. 1 may be transferrable via a land-based movable vessel, such as a truck and/or trailer. As examples, each of the following equipment and/or systems may be transferrable by a separate truck and trailer combination: the mast 114, the PHM 182 (and associated frame), the drawworks 124, the fingerboard 184, the power distribution center 196, the control center 198, and mud tanks 164 (and associated pump 142, shale shaker 160, and reconditioning equipment 162), the catwalk 166, etc. Some of the equipment and/or systems may be collapsible to accommodate transfer on a trailer. For example, the mast 114, the fingerboard 184, the catwalk 166, and/or other equipment and/or systems may be telescopic, folding, and/or otherwise collapsible. Other equipment and/or systems may be collapsible by other techniques, or may be separable into subcomponents for transportation purposes.

Figure 2:
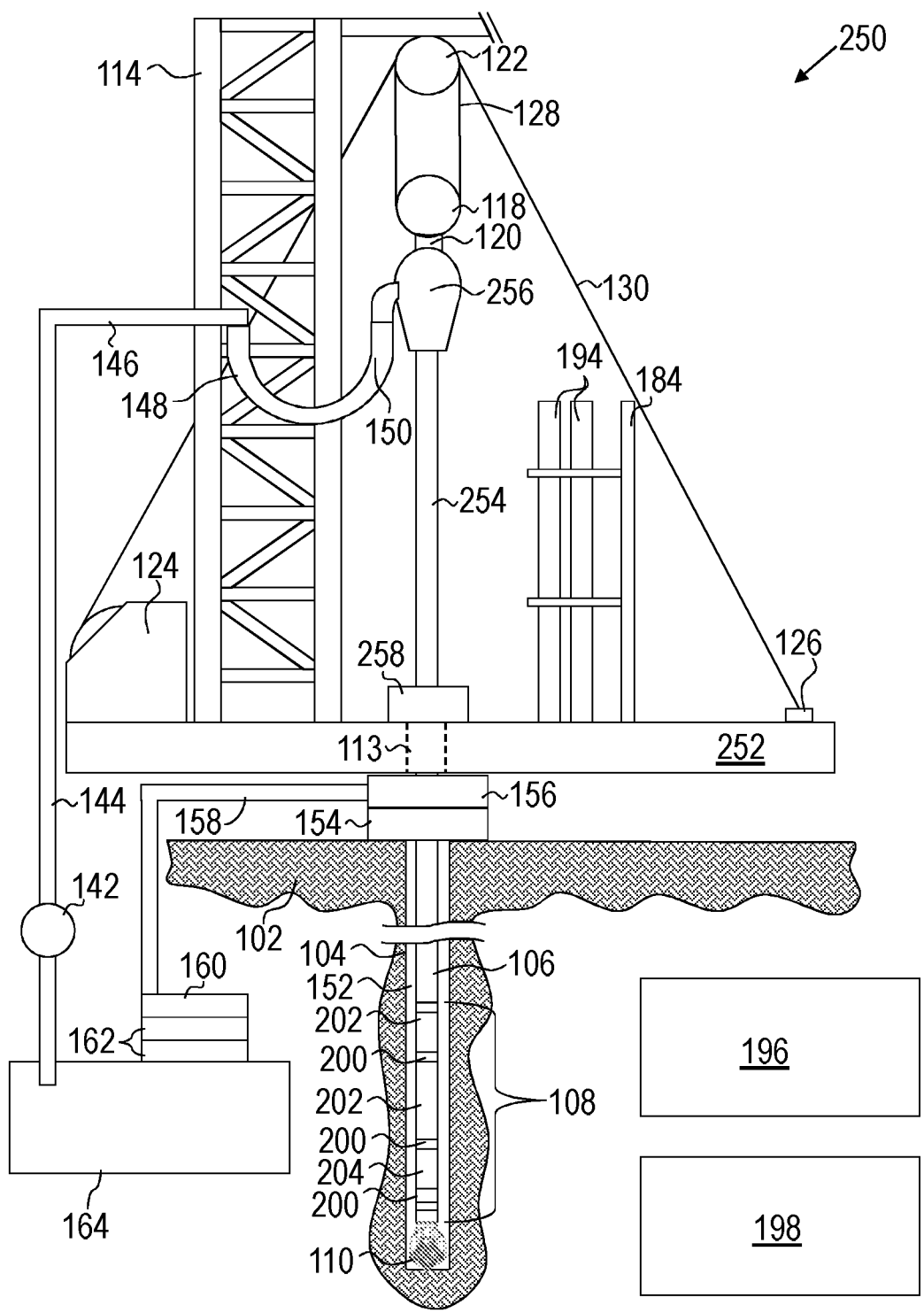
FIG. 2 is a schematic view of at least a portion of an example implementation of apparatus according to one or more aspects of the present disclosure.

FIG. 2 is a schematic view of at least a portion of an example implementation of a well construction system 250 operable to drill a wellbore 104 into one or more subsurface formations 102 at a well site in accordance with one or more aspects of the present disclosure. Some of the components and operation of those components are common (as indicated by usage of common reference numerals) between the well construction systems 100 and 250 of FIGS. 1 and 2, respectively. Hence, discussion of the common components may be omitted here for brevity, although a person of ordinary skill in the art will readily understand the components and their operation, with any modification, in the well construction system 250 of FIG. 2.

The well construction system 250 includes a mast 114 (at least a portion of which is depicted in FIG. 2) extending from a rig floor 252 that is erected over the wellbore 104. A swivel 256 and kelly 254 are suspended from the mast 114 and are mechanically coupled to the drillstring 106. A kelly spinner is between the kelly 254 and the swivel 256, although not specifically illustrated. The kelly 254 extends through an opening 112 through a master bushing (not specifically depicted) in the rig floor 252 and a kelly bushing 258 that engages the master bushing and the kelly 254. The rig floor 252 includes a rotary table that includes the master bushing and a prime mover. The prime mover of the rotary table, through the master bushing and the kelly bushing 258, provides a rotational force (e.g., torque) to drive rotational movement of the drillstring 106, such as to advance the drillstring 106 into the one or more subsurface formations 102 to form the wellbore 104.

The well construction system 250 includes hoisting equipment similar to what is depicted in FIG. 1 and described above. The hook 120 of the traveling block 118 mechanically couples with the swivel 256, although other means for coupling the traveling block 118 with the swivel 256 are also within the scope of the present disclosure. The drawworks 124 and the deadline anchor 126 are on and supported by the rig floor 252.

The well construction system 250 includes a drilling fluid circulation system similar to what is depicted in FIG. 1 and described above. The pump 142 delivers drilling fluid through, for example, a discharge line 144, a standpipe 146, and a rotary hose 148 to a port 150 of the swivel 256. The drilling fluid is then conducted through the kelly 254 and the drillstring 106 to the drill bit 110, exiting into the wellbore 104 via ports in the drill bit 110. The drilling fluid then circulates upward through the annulus 152 defined between the outside of the drillstring 106 and the wall of the wellbore 104. The drilling fluid can be passed through, e.g., a shale shaker 160, reconditioning equipment 162, one or more mud tanks 164, pump 142, and/or other equipment, as described above.

Although not illustrated, tongs, a cathead, and/or a spinning wrench or winch spinning system may be used for making up and/or breaking out connections of tubulars. A winch spinning system may include a chain, rope, or the like that is driven by a winch. The spinning wrench or winch spinning system can be used to apply low torque spinning to make up and/or break out a threaded connection between tubulars of the drillstring 106. For example, with a winch spinning system, a roughneck can wrap a chain around a tubular, and the chain is pulled by the winch to spin the tubular to make up and/or break out a connection. The tongs and cathead can be used to apply a high torque to make up and/or break out the threaded connection. For example, a roughneck can manually apply tongs on tubulars, and the cathead mechanically coupled to the tongs (such as by chains) can apply a high torque to make up and/or break out the threaded connection. Additionally, removable slips may be used in securing the drillstring 106 when making up and/or breaking out a connection. The removable slips may be placed by a roughneck between the drillstring 106 and the rig floor 252 and/or master bushing of the rotary table to suspend the drillstring 106 in the wellbore 104.

To form the wellbore 104 (e.g., "make hole"), the hoisting equipment lowers the drillstring 106 while the rotary table, through the master bushing and kelly bushing 258, rotates the drillstring 106. During this advancement of the drillstring 106, the removable slips are removed, and the tongs are clear of the drillstring 106. When the upper end of the kelly 254 nears the kelly bushing 258 and/or rig floor 252, the rotary table ceases rotating the drillstring 106. The hoisting equipment raises the kelly 254 until the upper end of the drillstring 106 protrudes from the master bushing and/or rig floor 252, and the slips are placed between the drillstring 106 and the master bushing and/or rig floor 252 to clamp the drillstring 106. When the kelly 254 is raised, a flange at the bottom of the kelly 254 can grasp the kelly bushing 258 to clear the kelly bushing 258 from the master bushing. Roughnecks then can break out the connection between the kelly 254 and the drillstring 106 using the tongs and cathead for applying a high torque, and the prime mover of the rotary table can cause the drillstring 106 to rotate to spin out of the connection to the kelly 254, for example.

A tubular may be positioned in preparation to being made up to the kelly 254 and the drillstring 106. For example, a tubular may be manually transferred to a mouse hole in the rig floor 252. Other methods and systems for transferring a tubular may be used.

With the connection between the drillstring 106 and the kelly 254 broken out, the hoisting equipment maneuvers the kelly 254 into a position such that a connection between the kelly 254 and the tubular projecting through the mouse hole can be made up. Roughnecks then can make up the connection between the kelly 254 and the tubular by spinning the kelly 254 with the kelly spinner to apply a low torque and by using the tongs and cathead to apply a high torque. The hoisting equipment then raises and maneuvers the kelly 254 and attached tubular into a position such that a connection between the attached tubular and drillstring 106 can be made up. Roughnecks then can make up the connection between the tubular and the drillstring 106 by clamping one of the tongs to the tubular and spinning the kelly 254 with the kelly spinner to apply a low torque and by using the tongs and cathead to apply a high torque. The slips are then removed, and the drillstring 106 and kelly 254 are lowered by the hoisting equipment until the drill bit 110 engages the one or more subsurface formations 102. The kelly bushing 258 engages the master bushing and the kelly 254, and the prime mover of the rotary table beings providing rotational movement to the drillstring 106 to resume drilling.

A power distribution center 196 and control center 198 are also at the well site as described above. The control center 198 houses one or more processing systems of a network of the well construction system 250. Details of the network of the well construction system 250 are described below. Generally, various equipment of the well construction system 250, such as the drilling fluid circulation system, the hoisting equipment, the rotary table, etc., can have various sensors and controllers to monitor and control the operations of that equipment. Additionally, the control center 198 can receive information regarding the formation and/or downhole conditions from modules and/or components of the BHA 108. The BHA 108 can comprise various components with various capabilities, such as measuring, processing, and storing information, as described above.

A person having ordinary skill in the art will readily understand that a well construction system may include more or fewer equipment than as described herein and/or depicted in the figures. Additionally, various equipment and/or systems of the example implementation of the well construction system 250 depicted in FIG. 2 may include more or fewer equipment. For example, various engines, motors, hydraulics, actuators, valves, or the like that were not described above and/or depicted in FIG. 2 may be included in other implementations of equipment and/or systems also within the scope of the present disclosure.

Additionally, the well construction system 250 of FIG. 2 may be implemented as a land-based rig or on an offshore rig. One or more aspects of the well construction system 250 of FIG. 2 may be incorporated in and/or omitted from a land-based rig or an offshore rig. Such modifications are within the scope of the present disclosure.

Even further, one or more equipment and/or systems of the well construction system 250 of FIG. 2 may be transferrable via a land-based movable vessel, such as a truck and/or trailer. As examples, each of the following equipment and/or systems may be transferrable by a separate truck and trailer combination: the mast 114, the drawworks 124, the fingerboard 184, the power distribution center 196, the control center 198, and mud tanks 164 (and associated pump 142, shale shaker 160, and reconditioning equipment 162), etc. Some of the equipment and/or systems may be collapsible to accommodate transfer on a trailer. For example, the mast 114, the fingerboard 184, and/or other equipment and/or systems may be telescopic, folding, and/or otherwise collapsible. Other equipment and/or systems may be collapsible by other techniques, or may be separable into subcomponents for transportation purposes.

The well construction systems 100 and 250 of FIGS. 1 and 2, respectively, illustrate various example equipment and systems that may be incorporated in a well construction system. Various other example well construction systems may include any combination of equipment and systems described with respect to the well construction systems 100 and 250 of FIGS. 1 and 2, respectively, and may omit some equipment and/or systems and/or include additional equipment and/or systems not specifically described herein. Such well construction systems are within the scope of the present disclosure.

Figure 3:
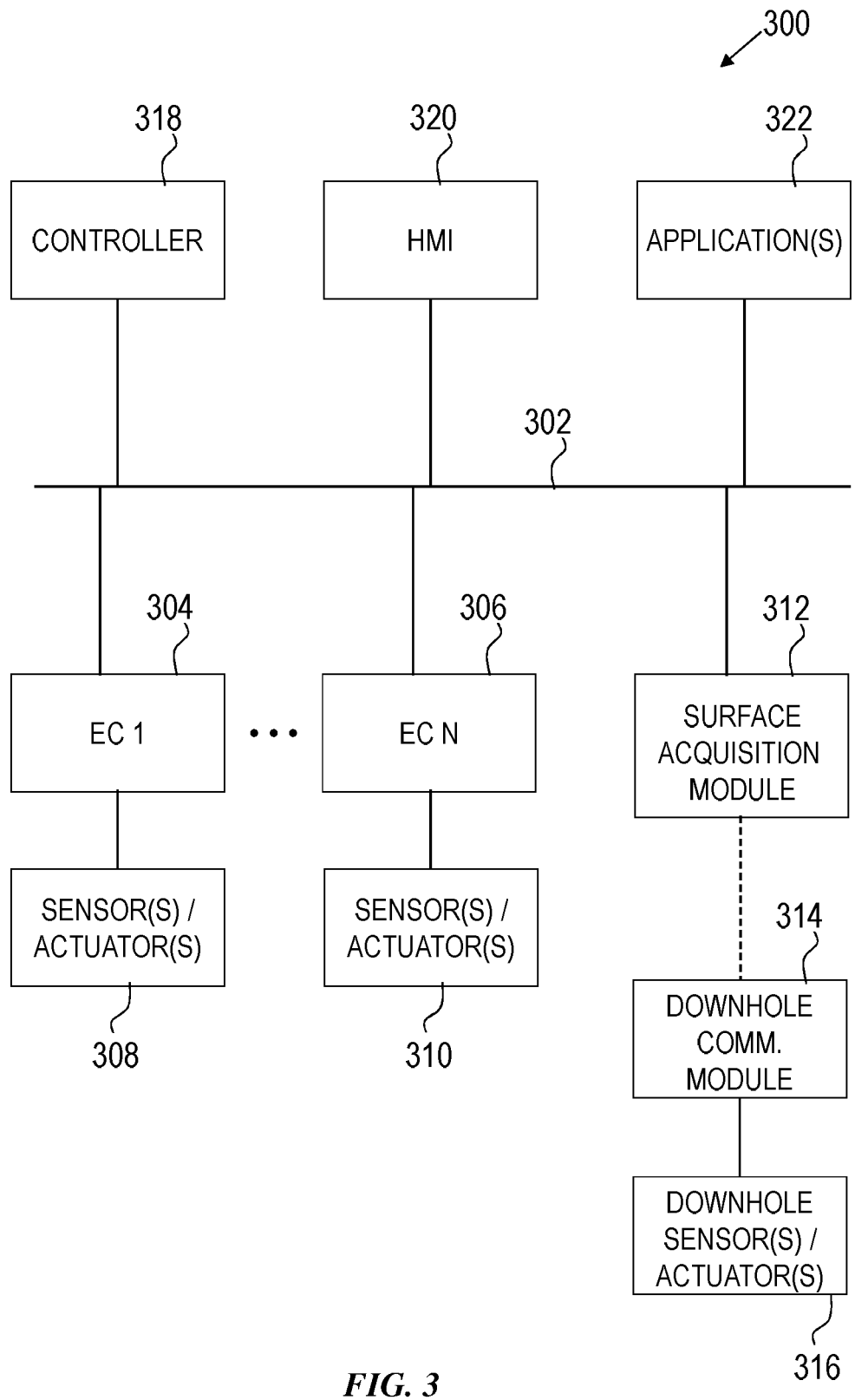
FIG. 3 is a schematic view of at least a portion of an example implementation of apparatus according to one or more aspects of the present disclosure.

FIG. 3 is a schematic view of at least a portion of a simplified operations network 300 of a well construction system according to one or more aspects of the present disclosure. The physical network used to implement the operations network 300 of FIG. 3 can have any network topology, such as a bus topology, a ring topology, a star topology, mesh topology, etc. The operations network 300 can include one or more processing systems, such as one or more network appliances, on and/or through which various aspects of the operations network 300 of FIG. 3 operate. Various other processing systems, such as ones that implement one or more switches, gateways, and/or other functionality, can be implemented in the operations network and are within the scope of the present disclosure. A person having ordinary skill in the art will readily understand how such processing systems and functionality may be implemented.

The operations network 300 includes a common data bus 302. In some examples, components communicatively coupled to the common data bus 302 can communicate using a common protocol, such as OPC, OPC UA, data distribution service (DDS) protocol, or other example protocols. The common data bus 302 can comprise or be implemented by a physical network, one or more software programs on one or more processing systems, and/or other techniques. Various component that communicate through the common data bus 302 can do so by various techniques. For example, multiple components may communicate, such as with any protocol, with a software application on one or more processing systems that translates communications from one or more of those components and implements the common data bus in software to permit one or more of those components to receive the communications from the common data bus. In some examples, each component may have a respective gateway that translates communications to the common protocol and transmits the translated communications through a physical common data bus to another component. In various examples, other techniques and/or combinations of the described example techniques may be implemented, which is within the scope of the present disclosure.

The operations network 300 includes N number of equipment controllers (ECs) communicatively coupled to the common data bus 302. An EC can include one or a plurality of programmable logic controllers (PLCs), industrial computers, personal computer based controllers, soft PLCs, the like, and/or any example controllers configured and operable to perform sensing of an environmental status and/or control equipment. In some example implementations, an EC may include one or a plurality of programmable logic controller (PLCs) and a communication gateway, in which the communication gateway is used to translate communications between the EC and the common data bus 302.

FIG. 3 illustrates an EC-1 304 and an EC-N 306 both communicatively coupled to the common data bus 302. The ECs (e.g., EC-1 304 and EC-N 306) can be at least a part of multiple control subsystems, respectively, of the well construction system, an entire control system of the well construction system, and/or any permutation therebetween. Example subsystems include a drilling fluid circulation system (which may include drilling fluid pumps, valves, fluid reconditioning equipment, etc.), a rig control system (which may include hoisting equipment, drillstring rotary mover equipment (such as a top drive and/or rotary table), a PHM, a catwalk, etc.), a managed pressure drilling system, a cementing system, a rig walk system, etc. A subsystem may include a single piece of equipment or may include multiple pieces of equipment, e.g., that are jointly used to perform one or more function. Each subsystem can include one or more ECs. Any number of control subsystems may be implemented, and any number of ECs may be used in any control subsystem. If multiple subsystems are on the same physical network for communication, the subsystems can be segmented from each other, such as by implementing respective virtual networks and/or domain designation. Further, in some examples, a gateway may be disposed between a subsystem (e.g., an EC of the subsystem) and the common data bus 302 to translate communications, and in other examples, a gateway is not between a subsystem (e.g., an EC of the subsystem) and the common data bus 302, such as when the subsystem implements the common protocol that is used through the common data bus 302.

The ECs are communicatively coupled to one or more sensors and/or one or more actuators. By being communicatively coupled to one or more actuators, the ECs may be operable to control equipment, for example. By being communicatively coupled to one or more sensors, the ECs may be operable to receive sensor and/or status data from sensors, for example. In the illustrated example of FIG. 3, the EC-1 304 is communicatively coupled to sensor(s) and/or actuator(s) 308, and the EC-N 306 is communicatively coupled to sensor(s) and/or actuator(s) 310.

Each EC can implement logic to monitor and/or control one or more sensors and/or one or more controllable equipment. Each EC can include logic to interpret a command and/or other data and to communicate a signal to one or more controllable equipment to control the one or more controllable equipment in response to the command and/or other data. Each EC can also receive a signal from one or more sensors, can reformat the signal, such as from an analog signal to a digital signal, into interpretable data. The logic for each EC can be programmable, such as compiled from a low level programming language, such as described in IEC 61131 programming languages for PLCs, structured text, ladder diagram, functional block diagrams, and/or functional charts; a high level programming language, such as C or C++; and/or other example programming languages.

Further in the illustrated example of FIG. 3, a downhole system is an example sensor system of the drilling system and is communicatively coupled to the common data bus 302. The downhole system includes a surface acquisition module 312 (e.g., at least a portion of surface equipment) that is communicatively coupled to the common data bus 302 and a downhole communication module 314 on a drillstring (e.g., in the BHA 108 of the drillstring 106 in FIGS. 1 and 2). The downhole communication module 314 is further communicatively coupled to downhole sensor(s) and/or actuator(s) 316 on the drillstring (e.g., in the BHA 108, such as in MWD module 200, sample module 202, and/or LWD module 204). The downhole communication module 314 can include a downhole mud-pulse telemetry system, a downhole electromagnetic signal communication system, a transceiver for wired communication, and/or other example communication systems. The surface acquisition module 312 can be implemented by or comprise a PLC, an industrial computer, a personal computer, or another processing system, for example, and can include appropriate communication equipment to communicate with the downhole communication module 314, such as a surface mud-pulse telemetry system, a surface electromagnetic signal communication system, a transceiver for wired communication, and/or other example communication systems. As described in additional examples below, the surface acquisition module 312 can receive data from the downhole communication module 314, which is further received from the downhole sensors and actuators 316, relating to conditions in the wellbore. This data can be communicated to the common data bus 302 from the surface acquisition module 312. Other sensor subsystems can be included in the operations network 300. Any number of sensor subsystems may be implemented.

The operations network 300 includes a coordinated controller 318, which may be a software program instantiated and operable on one or more processing systems, such as one or more network appliances. The coordinated controller 318 may be a software program written in and compiled from a high-level programming language, such as C/C++ or the like. The coordinated controller 318 can control operations of subsystems as described in further detail below.

The operations network 300 also includes one or more human-machine interfaces (HMIs), which as illustrated includes HMI 320. The HMI 320 may be, comprise, or be implemented by one or more processing system with a keyboard, a mouse, a touchscreen, a joystick, one or more control switches or toggles, one or more buttons, a trackpad, a trackball, an image/code scanner, a voice recognition system, a display device (such as a liquid crystal display (LCD), a light-emitting diode (LED) display, and/or a cathode ray tube (CRT) display), a printer, speaker, and/or other examples. The HMI 320 may permit entry of commands to the coordinated controller 318 and/or ECs (e.g., EC-1 304 and EC-N 306) and for visualization or other sensory perception of various data, such as sensor data, status data, and/or other example data.

The operations network 300 further includes one or more process applications 322, which may be a software program instantiated and operable on one or more processing systems, such as one or more network appliances, such as server devices. The one or more process applications 322 may each be a software program written in and compiled from a high-level programming language, such as C/C++ or the like. The one or more process applications 322 may monitor operations by analyzing data, e.g., consumed from the common data bus 302, and output information, e.g., a job plan to inform various construction operations. The job plan may include a model for controlling well construction within identified constraints, which can be transmitted to the coordinated controller 318. The job plan may contain an operation sequence for the equipment, which can be transmitted to the coordinated controller 318. The coordinated controller 318 can implement the job plan through determining and issuing commands to one or more of the ECs, which then control equipment according to the issued commands.

Other configurations of an operations network are also within the scope of the present disclosure. Different numbers of ECs, different numbers of subsystems, and different physical topologies and connections are within the scope of the present disclosure. Additionally, other example implementations may include or omit various components, such as an HMI, a historian database, and/or others, for example. Various aspects described with respect to the operations network 300 can be implemented by centralized computing on one processing system, by distributed computing on multiple processing systems, or any permutation therebetween.

Figure 4:
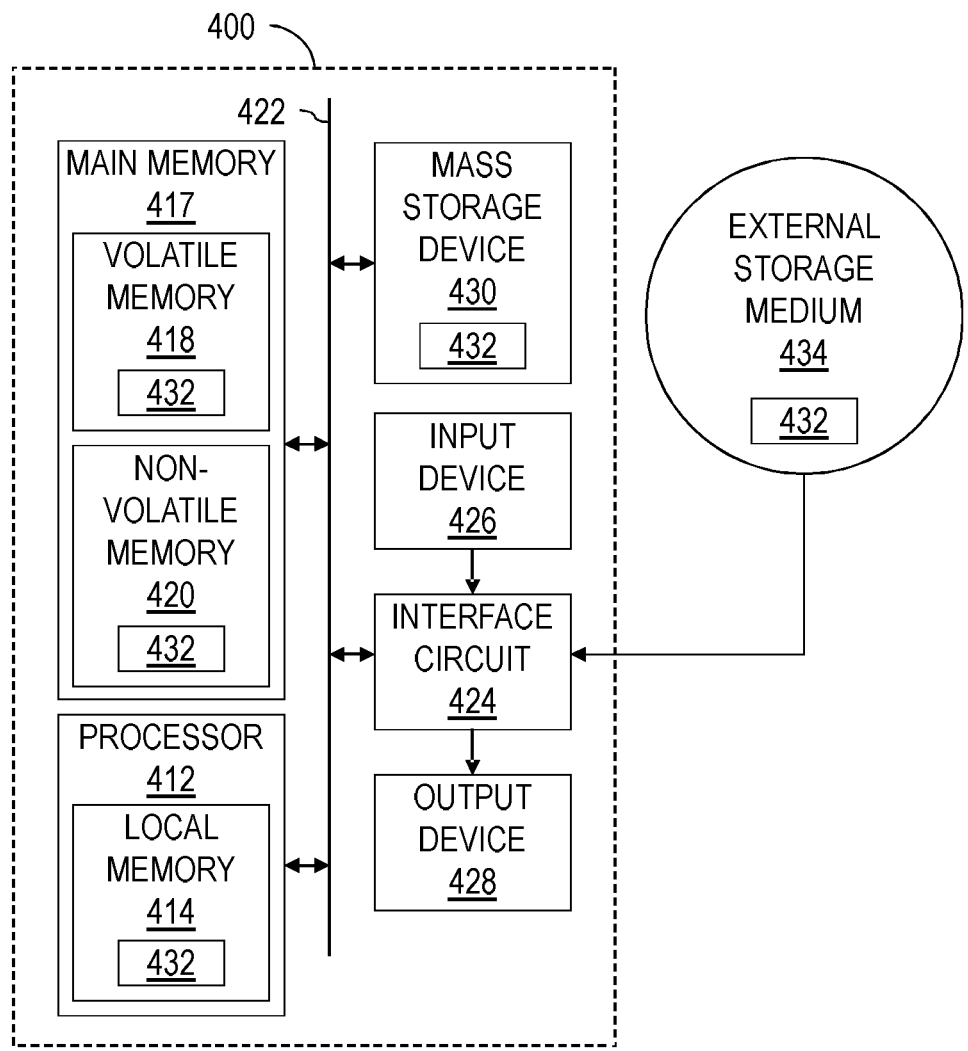
FIG. 4 is a schematic view of at least a portion of an example implementation of apparatus according to one or more aspects of the present disclosure.

FIG. 4 is a schematic view of at least a portion of an example implementation of a processing system 400 according to one or more aspects of the present disclosure. The processing system 400 may execute example machine-readable instructions to implement at least a portion of one or more of the methods and/or processes described herein.

The processing system 400 may be or comprise, for example, one or more processors, controllers, special-purpose computing devices, server devices, personal computers, network appliances, programmable logic controller (PLC), industrial computer, and/or other types of computing devices. In some examples, each of an EC, surface acquisition module, a coordinated controller, an HMI, and a process application may be implemented by a processing system 400 and/or a computer program operating on the processing system 400. Various processing systems 400 and functionalities can be in a single device or distributed across multiple devices.

The processing system 400 comprises a processor 412 such as, for example, a general-purpose programmable processor. The processor 412 may comprise a local memory 414, and may execute program code instructions 432 present in the local memory 414 and/or in another memory device. The processor 412 may execute, among other things, machine-readable instructions or programs to implement one or more aspects of the methods and/or processes described herein. The programs stored in the local memory 414 may include program instructions or computer program code that, when executed by an associated processor, enable one or more aspects of functionality as described herein. The processor 412 may be, comprise, or be implemented by one or more processors of various types operable in the local application environment, and may include one or more general purpose processors, special-purpose processors, microprocessors, digital signal processors (DSPs), field-programmable gate arrays (FPGAs), application-specific integrated circuits (ASICs), processors based on a multi-core processor architecture, and/or other processors. More particularly, examples of a processor 412 include one or more INTEL microprocessors, microcontrollers from the ARM and/or PICO families of microcontrollers, embedded soft/hard processors in one or more FPGAs, etc.

The processor 412 may be in communication with a main memory 417, such as via a bus 422 and/or other communication means. The main memory 417 may comprise a volatile memory 418 and a non-volatile memory 420. The volatile memory 418 may be, comprise, or be implemented by a tangible, non-transitory storage medium, such as random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 420 may be, comprise, or be implemented by a tangible, non-transitory storage medium, such as read-only memory, flash memory and/or other types of memory devices. One or more memory controllers (not shown) may control access to the volatile memory 418 and/or the non-volatile memory 420.

The processing system 400 may also comprise an interface circuit 424 connected and communicatively coupled to the bus 422. The interface circuit 424 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 424 may also comprise a graphics driver card. The interface circuit 424 may also comprise a communication device such as a modem or network interface card to facilitate exchange of data with external computing devices via a network, such as via Ethernet connection, digital subscriber line (DSL), telephone line, coaxial cable, cellular telephone system, and/or satellite, among other examples. The interface circuit 424 may also be, comprise, or be implemented by one or more of a digital output (DO) circuit, an analog output (AO) circuit, a digital input (DI) circuit, and/or an analog input (AI) circuit, such as when the processing system 400 is implemented as an EC.

One or more input devices 426 may be connected to the interface circuit 424. One or more of the input devices 426 may permit a user to enter data and/or commands for utilization by the processor 412. Each input device 426 may be, comprise, or be implemented by a keyboard, a mouse, a touchscreen, a track-pad, a trackball, an image/code scanner, and/or a voice recognition system, among other examples.

One or more output devices 428 may also be connected to the interface circuit 424. One or more of the output device 428 may be, comprise, or be implemented by a display device, such as LCD, a LED display, and/or a CRT display, among other examples. One or more of the output devices 428 may also or instead be, comprise, or be implemented by a printer, speaker, and/or other examples.

The processing system 400 may also comprise a mass storage device 430 for storing machine-readable instructions and data. The mass storage device 430 may be connected to the interface circuit 424, such as via the bus 422. The mass storage device 430 may be or comprise a tangible, non-transitory storage medium, such as a floppy disk drive, a hard disk drive, a compact disk (CD) drive, and/or digital versatile disk (DVD) drive, among other examples. The program code instructions 432 may be stored in the mass storage device 430, the volatile memory 418, the non-volatile memory 420, the local memory 414, and/or on a removable storage medium 434, such as a CD or DVD.

The modules and/or other components of the processing system 400 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

The following methods or processes may permit improved efficiency and operation and/or communications of a well construction system. Generally, in some example implementations, current and/or projected downhole conditions, along with possibly surface conditions, and/or an indication of a quality of a communication are used to determine operations of the well construction system at the well site. In some examples, such information may result in continuing planned operations or changing from the operations, such as by delaying an operation, changing parameters of the operation, and/or other changes. The methods or processes are described in the context of devices and components described above, although in other implementations, methods or processes within the scope of this disclosure may be performed in the context of other devices and components. The methods or processes described below are presented in a given order, although other implementations also within the scope of the present disclosure may comprise the described and/or other methods or processes in other orders and/or in parallel. Various other modifications to the methods or processes described below may also be consistent with the scope of the present disclosure. For example, such implementations may include additional or fewer calculations, determinations, computations, logic, and/or other aspects.

Figure 5:
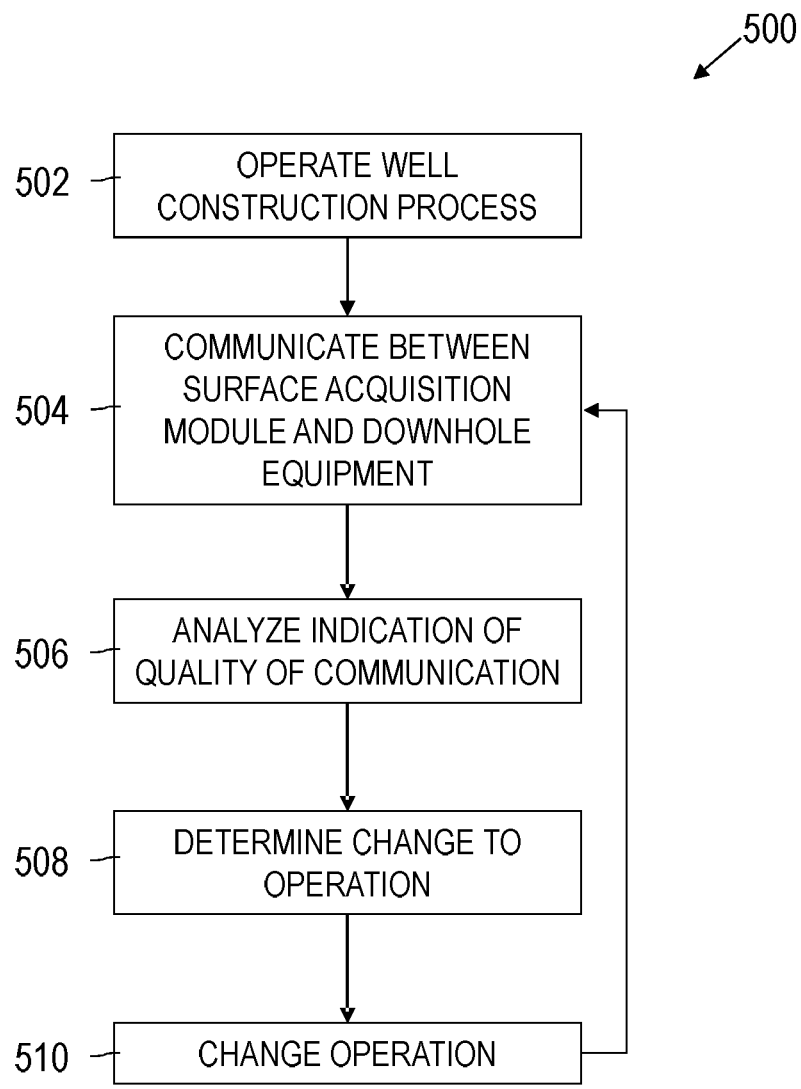
FIG. 5 is a flow-chart diagram of at least a portion of an example implementation of a method according to one or more aspects of the present disclosure.

FIG. 5 is a flow-chart diagram of at least a portion of an example implementation of a method (500) for implementing operations of a well construction system according to one or more aspects of the present disclosure. The method (500) includes operating (502) a well construction process. The well construction process can be, for example, any process used in constructing a well, such as drilling, cementing, and/or other example processes. The operating (502) can be by using the operations network 300 of FIG. 3, including using a job plan from the one or more process applications 322, a controller 318 to implement a job plan, and ECs (e.g., EC-1 304 and EC-N 306) to receive commands from the controller 318 and to control equipment for the well construction process.

The method (500) includes communicating (504) between a surface acquisition module and downhole equipment, e.g., while the well construction process is continued to be operated (502). The communication techniques can include mud-pulse telemetry, electromagnetic telemetry, wired communication, and/or other techniques, and such communication can be implemented by appropriate systems. The communications can include communications from the surface acquisition module to the downhole equipment (e.g., downlink communications) and/or communications from the downhole equipment to the surface acquisition module (e.g., uplink communications).

The method (500) includes analyzing (506) an indication of the quality of communication. In some examples, a surface acquisition module communicates settings and/or commands to the downhole equipment, and the downhole equipment repeats the received settings and/or commands that it received back to the surface acquisition module. In these examples, the indication of the quality of the communication can include how closely what was received by the surface acquisition module matches what was originally transmitted by the surface acquisition module. In other examples, the downhole equipment can determine a quality of communication, such as a strength of a received signal, a signal-to-noise ratio, and/or another quality degrading factor, and can transmit an indication of the quality of the communication to the surface acquisition module. In further examples, the surface acquisition module can determine an indication of a quality of communications received from the downhole equipment, such as a strength of a received signal, a signal-to-noise ratio, and/or another quality degrading factor.

If the indication of the quality of the communication indicates that the communication had a low fidelity and/or reliability, the method (500) proceeds to determining (508) a change to the operation of the well construction process. The change may be, for example, changing strokes per minute (SPM) of one or more drilling fluid pumps, changing a flow of drilling fluid through one or more valves in the drilling fluid circulation system by changing the extent to which the valve is opened and/or closed, changing rotations per minute (RPM) of the drillstring as rotated by the top drive, operating a drawworks, and/or changing other aspects of other example equipment. In some examples, the determined change may be based on a predetermined list of identified, likely sources of noise, for example. In other examples, an algorithm may be used to correlate noise in the communication with expected noise signals that can result from equipment used in the well construction process. The algorithm may account for what equipment is being operated during the communication and the conditions at the surface and downhole to determine a source of the noise. In some examples, multiple sources of noise may be identified, and a change to one or more of those sources may be determined. For example, a source that is expected to generate the largest amount of noise can have its operation changed to reduce the noise that is generated. In other examples, one or more sources of noise can be changed even if those sources may not be expected to generate the largest amount of noise if, for example, changing those sources may result in a satisfactory quality of communication. Further, in some examples, sources that are expected to generate noise may be changed based on the impact on the well construction process as a result of the change. For example, a change that has the least impact on the well construction process may be determined before a change that has a larger impact on the well construction process.

The method (500) includes changing (510) the operation of the well construction process as determined (508). The method (500) then includes communicating (504) between the surface acquisition module and the downhole equipment, which may permit looping of some of the method (500) until communicating (504) with a satisfactory indication of quality of the communication is achieved, for example. In some examples, different changes of operations may be determined (508) in different iterations of the loop. For example, different iterations can implement changes starting with a least impact on operations and increasing in impact until a satisfactory indication is achieved. Other techniques for choosing which change to implement may be used.

The analyzing (506), determining (508), and changing (510) of method (500) may be implemented by one or more software programs operating on one or more processing system. For example, the surface acquisition module can include a transducer that can interpret and convert a communication signal from the downhole equipment, such as through mud-pulse telemetry, to a digital signal that is then made available on the common data bus. In some examples, the process application(s) accesses the data signal from the common data bus and analyzes the digital signal to obtain an indication of a quality of the communication, which may be obtained as described above. The process application(s) can then determine what operation to change and can generate an updated job plan, which is communicated to the coordinated controller through the common data bus. The coordinated controller then implements the updated job plan by issuing commands to ECs to control equipment according to the updated job plan, which changes the operation of the well construction process. In some other examples, the coordinated controller accesses the data signal from the common data bus and analyzes the digital signal to obtain an indication of a quality of the communication, which may be obtained as described above. The coordinated controller can then determine what operation to change and implements the change by issuing commands to ECs to control equipment. Other processing system(s) and/or other software application(s) can be used to implement the analyzing (506), determining (508), and changing (510) in other examples.

Figure 6:
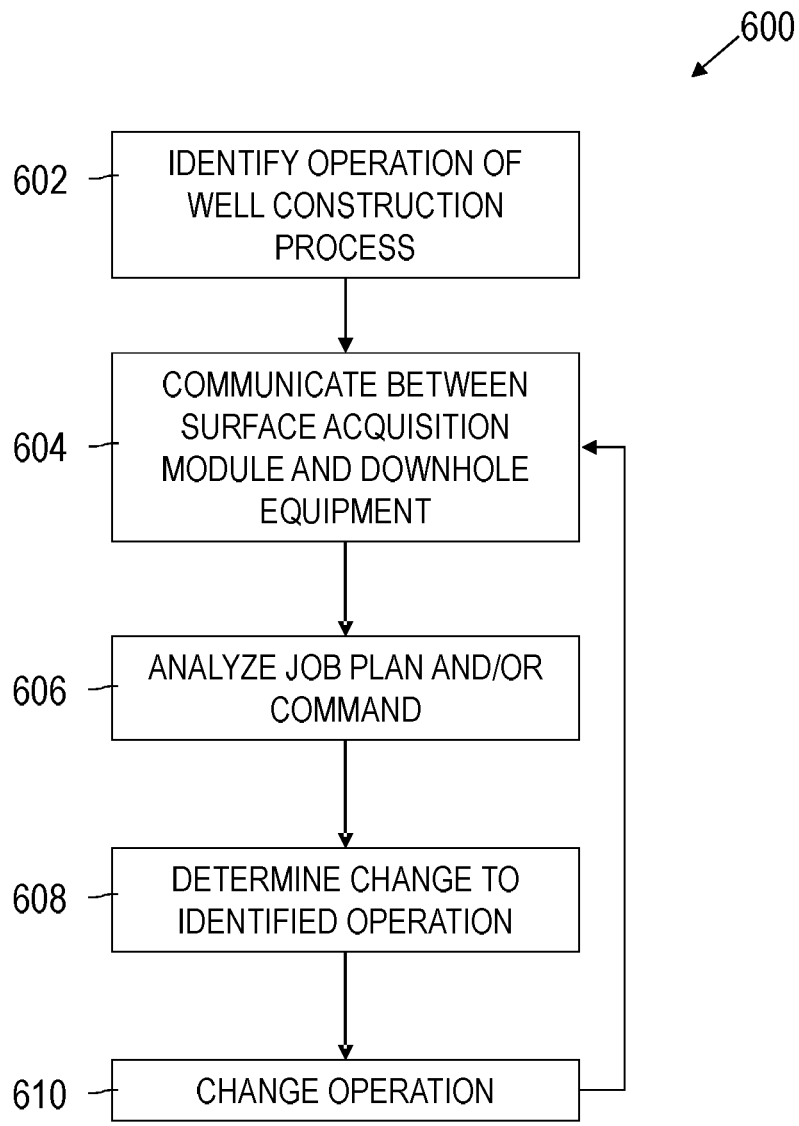
FIG. 6 is a flow-chart diagram of at least a portion of an example implementation of a method according to one or more aspects of the present disclosure.

FIG. 6 is a flow-chart diagram of at least a portion of an example implementation of a method (600) for implementing operations of a well construction system according to one or more aspects of the present disclosure. The method (600) includes identifying (602) an operation of a well construction process. The identifying (602) can identify an operation that has not begun but is intended to begin and/or can identify an operation that previously began and is on-going. The well construction process can be, for example, any process used in constructing a well, such as drilling, cementing, and/or other example processes. In a planned operation, the operation can be implemented by using the operations network 300 of FIG. 3, including using a job plan from the one or more process applications 322, a controller 318 to implement a job plan, and ECs (e.g., EC-1 304 and EC-N 306) to receive commands from the controller 318 and to control equipment for the well construction process. In an on-the-fly operation, an operator can input data to an HMI 320 that is received by the controller 318 via the operations network 300, and the controller 318 can implement the input as commands transmitted to the ECs for controlling equipment to implement the operation. The identifying (602) the operation of the well construction process can be based on a job plan and/or commands, which may be for beginning the operation and/or for an on-going operation. The identifying (602) the operation of the well construction process can include identifying an initial operation based on inputs through an HMI by an operator to begin the operation on-the-fly. The identifying (602) the operation of the well construction process can similarly include identifying on-going operations controlled at least in part through an HMI by an operator on-the-fly.

The method (600) includes communicating (604) between a surface acquisition module and downhole equipment, e.g., while the identified operation of the well construction process on-going and/or before the identified operation is initiated. The communication techniques can include mud-pulse telemetry, electromagnetic telemetry, wired communication, and/or other techniques, and such communication can be implemented by appropriate systems. The communications can include communications from the surface acquisition module to the downhole equipment (e.g., downlink communications) and/or communications from the downhole equipment to the surface acquisition module (e.g., uplink communications).

The method (600) includes analyzing (606) a job plan and/or one or more commands to be executed. The one or more commands can be generated from a job plan and/or based at least in part on input to an HMI by an operator operating on-the-fly. The analyzing (600) includes projecting and determining whether the job plan and/or one or more commands may affect (e.g., negatively affect) the communicating (604) between the surface acquisition module and the downhole equipment. For example, initiating and/or increasing SPM of one or more drilling fluid pumps and/or RPM of the top drive can cause more noise in a mud-pulse telemetry signal communicated between the surface acquisition module and the downhole equipment.

If the analyzing (606) projects that the job plan and/or one or more commands may affect the communicating (604), the method (600) proceeds to determining (608) a change to the identified operation of the well construction process. The change may be, for example, rescheduling and/or delaying the identified operation indicated by, for example, the job plan and/or one or more commands. For example, the identified operation of the job plan and/or one or more commands may be rescheduled and/or delayed until after the conclusion of the communicating (604) such that the operation does not affect the communicating (604). In other example implementations, the determined change may alter the operation by reducing one or more various levels of activities of the operation to permit the communicating (604) to be affected within some predetermined limits. For example, a job plan and/or one or more commands may indicate that the SPM of one or more drilling fluid pumps and/or RPM of the top drive is to be increased to a high level, and the change may permit the increase to be to a reduced level that permits the communicating (604) to be affected, albeit within a predetermined limit of noise.

The method (600) includes changing (610) the identified operation of the well construction process as determined (608). The method (600) then includes communicating (604) between the surface acquisition module and the downhole equipment, which may permit looping of some of the method (600) until communicating (604) is concluded, for example. In some examples, different changes of operations may be determined (608) in different iterations of the loop.

The analyzing (606), determining (608), and changing (610) of method (600) may be implemented by one or more software programs operating on one or more processing system. In some examples, the process application(s) analyzes the job plan to determine if an operation of the job plan may affect the communication signal between the surface acquisition module and downhole equipment. The process application(s) may access data from the common data bus to determine what the current wellbore conditions are and project what the wellbore conditions may become in response to the operation of the job plan. The process application(s) can then determine how to change the operation and can generate an updated job plan, which is communicated to the coordinated controller through the common data bus. The coordinated controller then implements the updated job plan by issuing commands to ECs to control equipment according to the updated job plan, which changes the operation of the well construction process. In some other examples, the coordinated controller receives a job plan and/or one or more commands from the process application(s) (or received input from an HMI and generates one or more commands based on the received input) and analyzes the job plan and/or one or more commands to determine if an operation of the job plan and/or one or more commands may affect the communication signal between the surface acquisition module and downhole equipment. The coordinated controller may access data from the common data bus to determine what the current wellbore conditions are and project what the wellbore conditions may become in response to the operation of the job plan and/or one or more commands. The coordinated controller can then determine what operation to change and implements the change by issuing commands to ECs to control equipment. Other processing system(s) and/or other software application(s) can be used to implement the analyzing (606), determining (608), and changing (610) in other examples.

Figure 7:
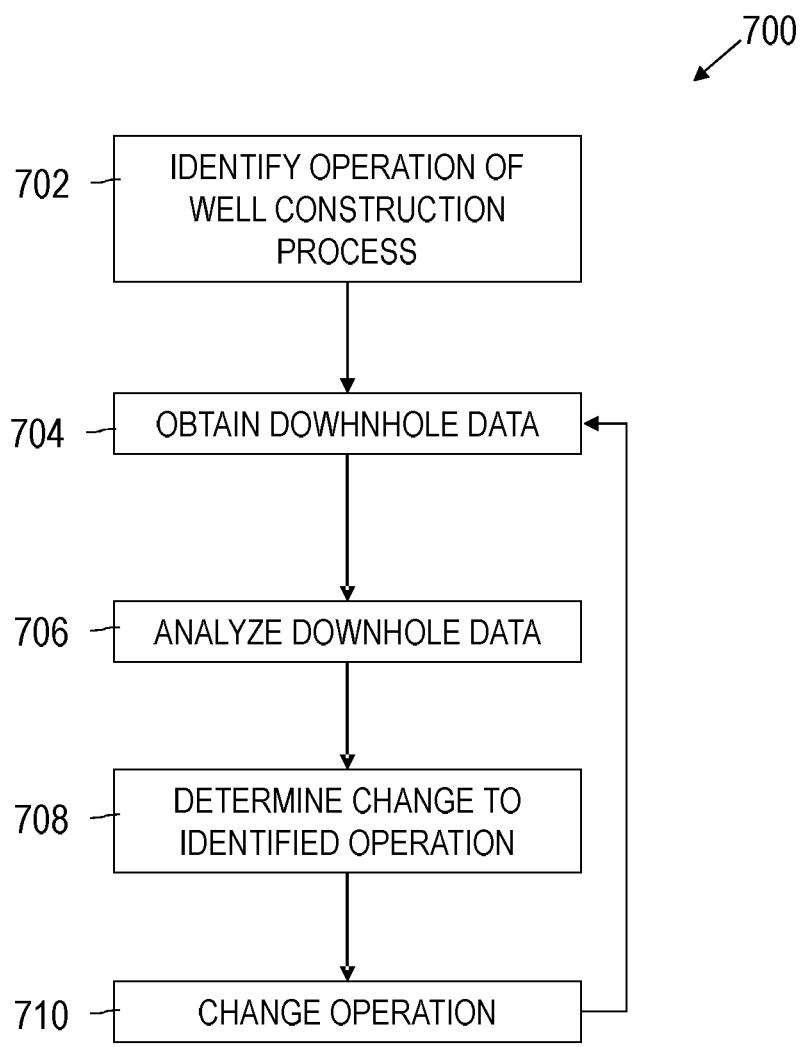
FIG. 7 is a flow-chart diagram of at least a portion of an example implementation of a method according to one or more aspects of the present disclosure.

FIG. 7 is a flow-chart diagram of at least a portion of an example implementation of a method (700) for implementing operations of a well construction system according to one or more aspects of the present disclosure. The method (700) includes identifying (702) an operation of a well construction process. The identifying (702) can identify an operation that has not begun but is intended to begin and/or can identify an operation that previously began and is on-going. The well construction process can be, for example, any process used in constructing a well, such as drilling, cementing, and/or other example processes. In a planned operation, the operation can be implemented by using the operations network 300 of FIG. 3, including using a job plan from the one or more process applications 322, a controller 318 to implement a job plan, and ECs (e.g., EC-1 304 and EC-N 306) to receive commands from the controller 318 and to control equipment for the well construction process. In an on-the-fly operation, an operator can input data to an HMI 320 that is received by the controller 318 via the operations network 300, and the controller 318 can implement the input as commands transmitted to the ECs for controlling equipment to implement the operation. The identifying (702) the operation of the well construction process can be based on a job plan and/or commands, which may be for beginning the operation and/or for an on-going operation. The identifying (702) the operation of the well construction process can include identifying an initial operation based on inputs through an HMI by an operator to begin the operation on-the-fly. The identifying (702) the operation of the well construction process can similarly include identifying on-going operations controlled at least in part through an HMI by an operator on-the-fly.

The method (700) includes obtaining (704) downhole data relating to conditions in the wellbore. Obtaining (704) the downhole data may include communicating downhole data measured in the wellbore from downhole equipment to a surface acquisition module, which may be before the identified operation of the well construction process is initiated, while the identified operation continues operation, while the identified operation is temporarily paused for the communication, and/or at other states. The communication techniques can include mud-pulse telemetry, electromagnetic telemetry, wired communication, and/or other techniques, and such communication can be implemented by appropriate systems. In some examples, downhole equipment communicates data that is measured in the wellbore. Various MWD, LWD, and/or SWD modules may be used to measure conditions downhole. Obtaining (704) the downhole data may instead or also include obtaining downhole data from equipment on the surface of the well site, which may be before the identified operation of the well construction process is initiated, while the identified operation continues operation, while the identified operation is temporarily paused for the communication, and/or at other states. This downhole data may be communicated from one or more ECs (e.g., originating from one or more sensors and/or actuators at the surface), which may be in one or more subsystems, through the common data bus. Some example data, e.g., measured in the wellbore and/or obtained from equipment on the surface, can include rotational speed of the drill bit, torque at the drill bit, a stick-slip ratio, annulus fluid pressure, weight-on-bit (WOB), wellbore trajectory, properties of fluid in the wellbore, and other data.

The method (700) includes analyzing (706) the downhole data. The downhole data, with or without other data acquired at the surface, can be analyzed to determine an efficacy of the identified operation (702) of the well construction process. As examples, some of which are described in more detail below, torsional vibrations (e.g., stick-slip) may occur during drilling, which may be determined based on analyzing rotational speeds of the drill bit downhole. Other examples are described below, and even more example data and analysis is within the scope of the present disclosure.

If the analysis (706) of the downhole data (e.g., with or without other surface data) indicates poor efficacy of and/or adverse effects caused by the identified operation of the well construction process, the method (700) proceeds to determining (708) a change to the identified operation of the well construction process. The change may be, for example, initiating and/or changing SPM of one or more drilling fluid pumps, initiating and/or changing RPM of the top drive, adding and/or altering a concentration of a constituent component of drilling fluid using, e.g., a hopper, operating a drawworks, and/or changing other aspects of other example equipment. The change may include changes to parameters of equipment based, at least in part, on the job plan under which the well construction process is operating and/or parameters determined based on inputs through an HMI from an operator on-the-fly. Various algorithms may be used to determine appropriate remedial action to change the identified operation of the well construction process, some of which are referenced below.

The method (700) includes changing (710) the identified operation of the well construction process as determined (708). The changing (710) may include changing a job plan and/or one or more commands, which may include changing one or more command generated in response to an input through an HMI from an operator controlling the operation on-the-fly. The method (700) then includes obtaining (704) downhole data, which may permit looping of some of the method (700) until an intended result of the well construction process is achieved, for example.

The analyzing (706), determining (708), and changing (710) of method (700) may be implemented by one or more software programs operating on one or more processing system. For example, the surface acquisition module can include a transducer that can interpret and convert a communication signal from the downhole equipment, such as through mud-pulse telemetry, to digital data, e.g., the downhole data, that is then made available on the common data bus. In some examples, the process application(s) accesses the digital data from the common data bus and analyzes the digital data to determine the efficacy of the well construction process, as described above. The process application(s) can then determine what operation to change and can generate an updated job plan, which is communicated to the coordinated controller through the common data bus. The coordinated controller then implements the updated job plan by issuing commands to ECs to control equipment according to the updated job plan, which changes the operation of the well construction process. In some other examples, the coordinated controller accesses the digital data from the common data bus and analyzes the digital data to determine the efficacy of the well construction process, as described above. The coordinated controller can then determine what operation to change and implements the change by issuing commands to ECs to control equipment, which may be to change parameters of the equipment, for example. Other processing system(s) and/or other software application(s) can be used to implement the analyzing (706), determining (708), and changing (710) in other examples.

As described above, communications from downhole equipment to a surface acquisition module may be adversely affected by noise, and a processing system according to one or more aspects of the present disclosure may be utilized to identify a source of noise and cause operations to be altered to reduce the effect of that source on the communications. Communication between the surface acquisition module and downhole equipment can be affected by noise generated by various equipment operating on the well construction system. For example, in mud-pulse telemetry implementations, noise may be caused by a pressure variation due to variations in SPM of one or more drilling fluid pumps, which can be caused by power variations that result from the operation of other heavy equipment, such as the drawworks. In electromagnetic telemetry implementations, noise may be a result of electromagnetic interference due to the operation of heavy equipment, such as by an induction motor like the top drive.

In some implementations, the mud-pulse or other telemetry may have a communication rate of 10 bits per second or less. In such implementations, among others, noise that can cause a poor signal-to-noise ratio (SNR) can result in failed communications, which can cause the communication process to be repeated, which in turn can delay operations.

After commencing communication from the downhole equipment to the surface acquisition module, the surface acquisition module may receive a signal, which may include noise. Once the signal is converted to a digital signal, for example, a processing system according to one or more aspects of the present disclosure may be utilized to analyze the digital signal to determine whether a SNR is too low. The processing system may then determine a probable source of the noise, such as by correlating known noise signatures of various equipment with the data signal. A probable source with a highest correlation between the data signal and the known noise signature of the source may be determined, for example. With the probable source identified, operation of the probable source can be altered to reduce the noise generated by that source. As an example, in mud-pulse telemetry, acoustic noise can be caused by drilling fluid pumps operating within the spectrum of the communication being transmitted from the downhole equipment to the surface acquisition module. The drilling fluid pumps can be identified as a probable source and can be controlled to operate outside of the spectrum of the communications to reduce noise within the communication spectrum. With the noise generating equipment in a state that reduces the noise in the communication, downhole data can be transmitted to the surface acquisition module, which can communicate the data to, for example, the coordinated controller and/or process application(s) through the common data bus.

The coordinated controller and/or the process application(s) may also coordinate the operation of equipment to reduce noise in the communication signal. The process application(s) may plan the operation of the well construction system in a way to reduce the noise by altering the operation or by scheduling or delaying the operation of equipment that can cause noise.

A payload on equipment may also be determined and used to start and/or stop the top drive. For example, the payload (e.g., reactive torque) on the top drive can depend on a length of the drillstring, the fluid in the wellbore, and the wellbore profile. When turning on a top drive to reach an intended RPM, this payload can affect the operation of the top drive. The payload of a drawworks (e.g., hookload) and/or a drilling fluid system component (e.g., pump pressure) may depend on the drillstring downhole, fluid property, and wellbore information. When starting such equipment, the payload can affect their operation.

The coordinated controller may receive the job plan from the process application(s) and/or input from an HMI when an operation is on-the-fly. The coordinated controller may also receive real-time drilling parameters from the drilling control system (such as the length of drillstring in the wellbore), equipment operation parameters, and/or downhole parameters from the downhole system. A payload corresponding to equipment can be calculated or estimated based on the received parameters. Example payloads can be an estimated hookload, an estimated pump pressure, an estimated torque, and/or other example estimated payloads. The estimated payload can be used as an input to operate the equipment, such as the variable frequency drive (VFD) of the top drive, drawworks, drilling fluid pump, etc. For example, a proportional-integral-derivative (PID) controller of the VFD for equipment could be adjusted based on the payload. In this way, for example, when an operator presses the start button to start some equipment or to ramp up the speed of some equipment, e.g., a top drive, the VFD controller of the top drive will use a set of coefficients of the PID controller to run the equipment in a smooth way. By operating the equipment in such a manner, adverse spikes and/or transient effects to the equipment may be reduced and/or avoided, which can reduce wear and tear of the equipment. Further, stick-slip and/or downhole vibration may be reduced and/or avoided, which may improve equipment life and drilling efficiency.

Resonant frequencies and/or rotational impedance of a drillstring may also be estimated, and control of drilling can be based on the resonant frequencies and/or rotational impedance, such as to control torsional vibrations (e.g., stick-slip or rotational vibrations). The resonant frequencies and/or rotational impedance can be estimated using data acquired from downhole modules, and/or in some instances, with data acquired from a surface acquisition module. A downhole module can measure oscillations and/or rotational speed of the drill bit, for example. A stick-slip ratio (e.g., a ratio of the max rotational speed minus the minimum rotational speed to two times the average rotational speed) of the drill bit can be determined based on measurements made in the downhole module. Based on the measurements and/or stick-slip ratio, a rotational speed of the top drive can be controlled to reduce torsional vibrations. A process application can calculate the parameters for controlling the top drive, such as by using the estimated resonant frequencies and/or rotational impedance of the drillstring, and the parameters for controlling the top drive can be passed on to the coordinated controller to control drilling.

Downhole data may also be used to determine parameters for operation transitions of various equipment. U.S. Patent Publication 2016/0139615, which is incorporated by reference herein in its entirety, includes description of how transitions between set parameters may be made using linear ramps over time periods chosen to reduce and/or avoid exciting strong resonances of the system. Examples of such resonances include the rotational resonances of the drillstring and the hydraulic resonances of the fluid in the annulus. The ramp times can be chosen based on the period of these resonances, and for some operations (for example, starting the drillstring from rest in a deviated well), the ramp times may be implemented based on additional calculations based on torque calculations and/or measurements and based on simulations of drilling dynamics. Examples of set parameters that may benefit from these transitions include drillstring rotation speed, WOB, annular choke back-pressure (e.g., for managed pressure drilling systems), and/or other example parameters. WOB, annulus fluid pressure, etc. may be measured by downhole equipment in some examples. Various calculations can be made by the process application(s), which can choose the appropriate ramp periods. The process application(s) can then pass parameters to the coordinated controller, which determines commands for one or more control systems, and which parameters may reduce and/or avoid exciting resonances.

Modulated flow variations from the pumps may also be used to communicate with downhole tools. In such communications, the length of time per bit for the downlink may be adjusted according to how well the flow modulations at surface are reflected in flow modulations measured by equipment near the bit. The transfer function between the surface acquisition module and the downhole equipment may be calculated (e.g., based on fluid type in the drillstring, pressure drops along the drillstring and at the bit, and/or fluid volume inside the drillstring). With the calculated transfer function, the appropriate length of time per bit can be determined. The calculations to calculate the transfer function and the length of time per bit can be performed by the process application(s), and the appropriate flow variation sequence can be communicated to the coordinated controller to implement commands for the control system.

As another example for a downlink for communications to a downhole system, U.S. Pat. No. 8,196,678, which is incorporated by reference herein in its entirety, includes description of how pump "over" and "under" shoots may be used during flow modulation sequences in order to improve detectability of flow changes downhole. Appropriate time periods and flow levels for a modulation sequence can include some additional modelling and may also be kept within limits for equipment of the well construction system. Again, these calculations may be performed by the process application(s), with the results being communicated to the coordinated controller to implement commands for the control system.

As a further example for "over" and "under" shoots with a hydraulic system, U.S. Patent Publication 2016/0090800, which is incorporated by reference herein in its entirety, includes description of how, when initiating fluid flow in the wellbore, a higher initial flow may be used to reduce the time to when the first survey point can be transmitted to surface. This may be based on a calculation using the properties of the fluid hydraulic system, optionally combined with measurements made during drilling (e.g., the time for the pressure to fall after the pumps are switched off). The process application(s) may perform these calculations, may monitor the pumps' off pressure fall, and may monitor the pump state. The process application(s) may therefore identify when the pumps have been switched off and measure the time for the standpipe pressure to fall to a chosen fraction of its initial value. Once the calculations and/or measurements have been made, a pump flow sequence can be calculated and communicated to the coordinated controller to implement commands for the control system.

Commands may also be communicated to downhole equipment and repeated back by the downhole equipment to the surface acquisition module, and based on a comparison between the commands transmitted and received by the surface acquisition module, a determination can be made whether to change an operation for better communication between the surface acquisition module and downhole equipment. For example, if the repeated command received at the surface acquisition module matches what was transmitted by the surface acquisition module, operations may continue unaltered, and if there is no match, operations may be altered before communications are retried.

Data measured downhole may suffer under some operating conditions, and when such conditions are detected, operation of the well construction can be altered. For example, LWD measurements can be detrimentally affected by drilling at too great of a speed in some situations. When poor measurements are detected, such as by a processing system at the surface and/or by an indication communicated from a downhole module, equipment of the well construction system can be controlled to improve the LWD measurements. For example, a drillstring rotation can be slowed down by controlling a top drive, and/or a WOB may be reduced by controlling a drawworks. These actions can reduce noise that can degrade LWD measurements, and hence, by controlling the top drive and/or drawworks, the LWD measurements may improve.

In view of the entirety of the present disclosure, including the figures and the claims, a person having ordinary skill in the art will readily recognize that the present disclosure introduces an apparatus comprising a processing system comprising a processor and a memory including computer program code, wherein the processing system is operable to: (A) determine a change to an operation of a well construction system based on: (i) an indication of a quality of transmitted communication between downhole equipment of the well construction system in a wellbore and surface communication equipment of the well construction system transmitted during the operation; (ii) a projected effect of the operation on future communication between the downhole equipment and the surface communication equipment; (iii) downhole data related to one or more conditions in the wellbore; or (iv) a combination thereof; and (B) cause the change to the operation of the well construction system to be implemented.

The processing system may be a first processing system, the apparatus may further comprise a second processing system communicatively coupled to the first processing system and comprising a processor and a memory including computer program code, the first processing system may be further operable to develop an updated job plan to cause the change to the operation of the well construction system to be implemented, and the second processing system may be operable to interpret the updated job plan and issue one or more commands to one or more equipment controllers of surface equipment to implement the updated job plan.

The processing system may be further operable to cause the change to the operation of the well construction system to be implemented by issuing one or more commands to one or more controllers of surface equipment.

The processing system may be further operable to determine the change to the operation of the well construction system based on surface measurement data not acquired downhole.

The determination may be based on the indication of the quality of the transmitted communication, and the indication of the quality may be based on noise in a signal of the transmitted communication.

The determination may be based on the indication of the quality of the transmitted communication, and the indication of the quality may be based on a content of the transmitted communication relative to a previous communication.

The determination may be based on the projected effect of the operation on the future communication. The projected effect may be based on (i) one or more current conditions in the wellbore, a current state of the well construction system, or a combination thereof, and (ii) a future sequence of the operation.

The determination may be based on the downhole data. The downhole data may include measurement data measured in the wellbore. The downhole data may include data obtained from originating equipment at a surface level. The change may be to operational parameters of a top drive and/or a drawworks. The change may be to operational parameters of a drilling fluid system component. For example, the drilling fluid system component may be a pump and/or a valve. The drilling fluid system component may be operable to add or alter a concentration of a constitutional component of drilling fluid circulated by the drilling fluid system.

The present disclosure also introduces a method comprising operating a processing system comprising a processor and a memory including computer program code, wherein operating the processing system comprises: (A) determining a change to an operation of at least some of surface equipment of the well construction system based on: (i) an indication of a quality of a transmitted communication between downhole equipment of the well construction system in a wellbore and surface communication equipment of the well construction system transmitted during the operation; (ii) a projected effect of the operation on future communication between the downhole equipment and the surface communication equipment; (iii) downhole data related to one or more conditions in the wellbore; or (iv) a combination thereof; and (B) causing the change to the operation to be implemented.

The processing system may be a first processing system, the method may further comprise operating a second processing system comprising a processor and a memory including computer program code, operating the first processing system may further comprise developing an updated job plan to cause the change to the operation of the well construction system to be implemented, and operating the second processing system may comprise interpreting the updated job plan and issuing one or more commands to one or more equipment controllers of the surface equipment to implement the updated job plan.

Operating the processing system may further comprise causing the change to the operation of the well construction system to be implemented by issuing one or more commands to one or more controllers of the surface equipment.

Operating the processing system may further comprise determining the change to the operation of the well construction system based on surface measurement data acquired at a surface level.

Determining the change may be based on the indication of the quality of the transmitted communication, and the indication of the quality may be based on noise in a signal of the transmitted communication.

Determining the change may be based on the indication of the quality of the transmitted communication, and the indication of the quality may be based on a content of the transmitted communication relative to a previous communication.

Determining the change may be based on the projected effect of the operation on the future communication. The projected effect may be based on (i) one or more current conditions in the wellbore, a current state of the well construction system, or a combination thereof, and (ii) a future sequence of the operation.

Determining the change may be based on the downhole data. The downhole data may include measurement data measured in the wellbore. The downhole data may include data obtained from originating equipment at a surface level. In such implementations, among others within the scope of the present disclosure, the change may be to operational parameters of a top drive, a drawworks, and/or a drilling fluid system component.

The present disclosure also introduces an apparatus comprising a processing system comprising a processor and a memory including computer program code, wherein the processing system is operable to: analyze a communication between downhole equipment and surface equipment of a well construction system to obtain an indication of a quality of the communication; determine a change to an operation of the well construction system based on the indication of the quality of the communication; and cause the change to the operation of the well construction system to be implemented.

The processing system may be a first processing system, the apparatus may further comprise a second processing system communicatively coupled to the first processing system and comprising a processor and a memory including computer program code, the first processing system may be further operable to develop an updated job plan to cause the change to the operation of the well construction system to be implemented, and the second processing system may be operable to interpret the updated job plan and issue one or more commands to one or more equipment controllers of the surface equipment to implement the updated job plan.

The processing system may be further operable to cause the change to the operation of the well construction system to be implemented by issuing one or more commands to one or more controllers of the surface equipment.

The analysis may determine an indication of noise in a signal of the communication to obtain the indication of the quality.

The analysis may compare a content of the communication relative to a previous communication to obtain the indication of the quality.

The present disclosure also introduces a method comprising operating a processing system comprising a processor and a memory including computer program code, wherein operating the processing system comprises: analyzing a communication between downhole equipment and surface equipment of a well construction system to obtain an indication of a quality of the communication; determining a change to an operation of the well construction system based on the indication of the quality of the communication; and causing the change to the operation of the well construction system to be implemented.

The processing system may be a first processing system, the method may further comprise operating a second processing system comprising a processor and a memory including computer program code, operating the first processing system may further comprise developing an updated job plan to cause the change to the operation of the well construction system to be implemented, and operating the second processing system may comprise interpreting the updated job plan and issuing one or more commands to one or more equipment controllers of the surface equipment to implement the updated job plan.

Operating the processing system may further comprise causing the change to the operation of the well construction system to be implemented by issuing one or more commands to one or more controllers of the surface equipment.

Analyzing the communication may comprise determining an indication of noise in a signal of the communication to obtain the indication of the quality.

Analyzing the communication may comprise comparing a content of the communication relative to a previous communication to obtain the indication of the quality.

The present disclosure also introduces an apparatus comprising a processing system comprising a processor and a memory including computer program code, wherein the processing system is operable to: determine a projected effect on a future communication based on a future sequence of an operation of a well construction system, wherein the future communication is between downhole equipment and surface equipment of the well construction system; determine a change to the operation of the well construction system based on the projected effect; and cause the change to the operation of the well construction system to be implemented.

The processing system may be a first processing system, the apparatus may further comprise a second processing system communicatively coupled to the first processing system and comprising a processor and a memory including computer program code, the first processing system may be further operable to develop an updated job plan to cause the change to the operation of the well construction system to be implemented, and the second processing system may be operable to interpret the updated job plan and issue one or more commands to one or more equipment controllers of the surface equipment to implement the updated job plan.

The processing system may be further operable to cause the change to the operation of the well construction system to be implemented by issuing one or more commands to one or more controllers of the surface equipment.

The change to the operation may include delaying the future sequence.

The change to the operation may include changing the future sequence to reduce the projected effect.

The present disclosure also introduces a method comprising operating a processing system comprising a processor and a memory including computer program code, wherein operating the processing system comprises: determining a projected effect on a future communication based on a future sequence of an operation of a well construction system, wherein the future communication is between downhole equipment and surface equipment of the well construction system; determining a change to the operation of the well construction system based on the projected effect; and causing the change to the operation of the well construction system to be implemented.

The processing system may be a first processing system, the method may further comprise operating a second processing system comprising a processor and a memory including computer program code, operating the first processing system may further comprise developing an updated job plan to cause the change to the operation of the well construction system to be implemented, and operating the second processing system may comprise interpreting the updated job plan and issuing one or more commands to one or more equipment controllers of the surface equipment to implement the updated job plan.

Operating the processing system may further comprise causing the change to the operation of the well construction system to be implemented by issuing one or more commands to one or more controllers of the surface equipment.

The change to the operation may include delaying the future sequence.

The change to the operation may include changing the future sequence to reduce the projected effect.

The present disclosure also introduces an apparatus comprising a processing system comprising a processor and a memory including computer program code, wherein the processing system is operable to: determine a change to an operation of a well construction system based on downhole data relating to one or more conditions in a wellbore at a well site; and cause the change to the operation of the well construction system to be implemented.

The processing system may be a first processing system, the apparatus may further comprise a second processing system communicatively coupled to the first processing system and comprising a processor and a memory including computer program code, the first processing system may be further operable to develop an updated job plan to cause the change to the operation of the well construction system to be implemented, and the second processing system may be operable to interpret the updated job plan and issue one or more commands to one or more equipment controllers of surface equipment to implement the updated job plan.

The processing system may be further operable to cause the change to the operation of the well construction system to be implemented by issuing one or more commands to one or more controllers of surface equipment.

The downhole data may include measurement data measured in the wellbore.

The downhole data may include data obtained from originating equipment at a surface level.

The processing system may be further operable to determine the change to the operation of the well construction system based on surface measurement data acquired at a surface level.

The change may be to operational parameters of a top drive, a drawworks, and/or a drilling fluid system, for example.

The present disclosure also introduces a method comprising operating a processing system comprising a processor and a memory including computer program code, wherein operating the processing system comprises: determining a change to an operation of a well construction system based on downhole data relating to one or more conditions in a wellbore at a well site; and causing the change to the operation of the well construction system to be implemented.

The processing system may be a first processing system, the method may further comprise operating a second processing system comprising a processor and a memory including computer program code, operating the first processing system may further comprise developing an updated job plan to cause the change to the operation of the well construction system to be implemented, and operating the second processing system may comprise interpreting the updated job plan and issuing one or more commands to one or more equipment controllers of surface equipment to implement the updated job plan.

Operating the processing system may further comprise causing the change to the operation of the well construction system to be implemented by issuing one or more commands to one or more controllers of surface equipment.

The downhole data may include measurement data measured in the wellbore.

The downhole data may include data obtained from originating equipment at a surface level.

Operating the processing system may further comprise determining the change to the operation of the well construction system based on surface measurement data acquired at a surface level.

The change may include altering operational parameters of a top drive, a drawworks, and/or a drilling fluid system, for example.

The present disclosure also introduces an apparatus comprising: (A) equipment of a well construction apparatus; (B) one or more equipment controllers operable to control the equipment; and (C) a processing system comprising a processor and a memory including computer program code, wherein the one or more equipment controllers and the processing system are communicatively coupled to a network, wherein the processing system is operable to: (i) identify an operation of the equipment; (ii) determine a change to the identified operation of the equipment based on downhole data relating to one or more conditions in a wellbore formed by the well construction apparatus; and (iii) cause the change to the identified operation to be implemented.

The apparatus may further comprise surface communication equipment operable to communicate with downhole equipment in the wellbore, wherein the surface communication equipment may be communicatively coupled to the network, and the downhole data may include measurement data measured in the wellbore by the downhole equipment and communicated to the surface communication equipment.

The apparatus may further comprise one or more sensors on the surface communicatively coupled to the network, and the downhole data may include data obtained from the one or more sensors on the surface.

The processing system may be operable to identify the operation based on a job plan.

The processing system may be operable to identify the operation based on one or more commands to be issued to the equipment.

The apparatus may further comprise a human-machine interface communicatively coupled to the network, and the processing system may be operable to identify the operation based on input to the human-machine interface.

The processing system may be operable to identify the operation before the operation is initiated.

The processing system may be operable to identify the operation while the operation is on-going.

The change may include delaying or rescheduling issuance of one or more commands to the equipment controllers.

The change may include changing operational parameters of the equipment.

The identified operation may be a drilling process operation, and the equipment may include a top drive and/or a drawworks. In such implementations, among others within the scope of the present disclosure, the drilling process operation may include initiating, ramping up, or maintaining a rotating speed of the top drive, and the change may include a change, relative to the identified drilling process operation, to one or more parameters relating to the initiating, ramping up, or maintaining the rotating speed of the top drive, one or more commands to be issued to at least one of the one or more equipment controllers operable to control the top drive, or a combination thereof.

The present disclosure also introduces a method comprising: (A) operating a processing system comprising a processor and a memory including computer program code, wherein the processing system is communicatively coupled to a network, wherein operating the processing system comprises: (i) identifying an operation of equipment of a well construction apparatus; and (ii) determining a change to the identified operation of the equipment based on downhole data relating to one or more conditions in a wellbore formed by the well construction apparatus; and (B) operating the equipment of the well construction apparatus based on the change, wherein operating the equipment comprises controlling the equipment using one or more equipment controllers communicatively coupled to the network.

The method may comprise: measuring the downhole data in the wellbore by downhole equipment in the wellbore; and communicating the downhole data to surface communication equipment from the downhole equipment, wherein the surface communication equipment is communicatively coupled to the network.

The method may comprise obtaining the downhole data using one or more sensors on the surface communicatively coupled to the network.

Identifying the operation may be based on a job plan, and/or on one or more commands to be issued to the equipment.

The method may comprise initiating operating the operation of the equipment before the change is determined, and operating the operation may be on-going when the change is determined. In such implementations, among others within the scope of the present disclosure, operating the operation may be based on a job plan. Operating the operation may be based on input to a human-machine interface communicatively coupled to the network, and the input to the human-machine interface may be on-the-fly.

The operation may be identified before the operation is initiated. In such implementations, among others within the scope of the present disclosure, the operation may be based on a job plan and/or on input to a human-machine interface communicatively coupled to the network, and the input to the human-machine interface may be on-the-fly.

The change may include delaying or rescheduling issuance of one or more commands to the equipment controllers.

The change may include changing operational parameters of the equipment.

The identified operation may be a drilling process operation, and the equipment may include a top drive and/or a drawworks. In such implementations, among others within the scope of the present disclosure, operating the equipment may include initiating, ramping up, or maintaining a rotating speed of the top drive, and the change may include a change, relative to the identified drill process operation, to one or more parameters relating to the initiating, ramping up, or maintaining the rotating speed of the top drive, one or more commands to be issued to at least one of the one or more equipment controllers operable to control the top drive, or a combination thereof.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
a processing system comprising a processor and a memory including computer program code, wherein the processing system is operable to:
receive an indication of a quality of transmitted communication between downhole equipment of a well construction system in a wellbore and surface communication equipment of the well construction system transmitted during an operation of the well construction system;
in response to determining that the indication of the quality indicates that the communication has one or both of low fidelity and low reliability:
identify a probable cause of the low fidelity or the low reliability;
determine one or more changes to the operation that will improve the quality of the transmitted communication;
and
cause the change to the operation of the well construction system to be implemented.

2. The apparatus of claim 1 wherein:
the processing system is a first processing system;
the apparatus further comprises a second processing system communicatively coupled to the first processing system and comprising a processor and a memory including computer program code;
the first processing system is further operable to develop an updated job plan to cause the change to the operation of the well construction system to be implemented; and
the second processing system is operable to interpret the updated job plan and issue one or more commands to one or more equipment controllers of surface equipment to implement the updated job plan.

3. The apparatus of claim 1 wherein the processing system is further operable to cause the change to the operation of the well construction system to be implemented by issuing one or more commands to one or more controllers of surface equipment.

4. The apparatus of claim 1 wherein the determination is based on the indication of the quality of the transmitted communication, and wherein the indication of the quality is based on noise in a signal of the transmitted communication.

5. The apparatus of claim 1 wherein the determination is based on the indication of the quality of the transmitted communication, and wherein the indication of the quality is based on a content of the transmitted communication relative to a previous communication.

6. The apparatus of claim 1 wherein the determination is based on the projected effect of the operation on the future communication.

7. The apparatus of claim 1 wherein the determination is based on the downhole data.

8. An apparatus comprising:
equipment of a well construction apparatus;
one or more equipment controllers operable to control the equipment; and
a processing system comprising a processor and a memory including computer program code, wherein the one or more equipment controllers and the processing system are communicatively coupled to a network, wherein the processing system is operable to:
identify an operation of the equipment;
receive an indication of a quality of transmitted communication between downhole equipment in a wellbore and surface communication equipment that is transmitted during an operation of the well construction apparatus;
in response to determining that the indication of the quality indicates that the communication has one or both of low fidelity and low reliability:
identify a probable cause of the low fidelity or the low reliability;
determine one or more changes to the operation that will improve the quality of the transmitted communication; and
cause the change to the identified operation to be implemented.

9. The apparatus of claim 8 further comprising surface communication equipment operable to communicate with downhole equipment in the wellbore, wherein:
the surface communication equipment is communicatively coupled to the network; and
the downhole data includes measurement data measured in the wellbore by the downhole equipment and communicated to the surface communication equipment.

10. The apparatus of claim 8 further comprising one or more sensors on the surface communicatively coupled to the network, wherein the downhole data includes data obtained from the one or more sensors on the surface.

11. The apparatus of claim 8 wherein the processing system is operable to identify the operation based on a job plan.

12. The apparatus of claim 8 wherein the processing system is operable to identify the operation based on one or more commands to be issued to the equipment.

13. The apparatus of claim 8 further comprising a human-machine interface communicatively coupled to the network, where the processing system is operable to identify the operation based on input to the human-machine interface.

14. A method comprising:
operating a processing system comprising a processor and a memory including computer program code, wherein the processing system is communicatively coupled to a network, wherein operating the processing system comprises:
identifying an operation of equipment of a well construction apparatus; and
receiving an indication of a quality of transmitted communication between downhole equipment in a wellbore and surface communication equipment that is transmitted during an operation of the well construction apparatus;
in response to determining that the indication of the quality indicates that the communication has one or both of low fidelity and low reliability:
identifying a probable cause of the low fidelity or the low reliability;
determining one or more changes to the operation that will improve the quality of the transmitted communication; and
operating the equipment of the well construction apparatus based on the one or more changes, wherein operating the equipment comprises controlling the equipment using one or more equipment controllers communicatively coupled to the network.

15. The method of claim 14 further comprising initiating operating the operation of the equipment before the change is determined, wherein the operating the operation is on-going when the change is determined.

16. The method of claim 14 wherein the operation is identified before the operation is initiated.

17. The method of claim 14 wherein the change includes delaying or rescheduling issuance of one or more commands to the equipment controllers.

18. The method of claim 14 wherein the change includes changing operational parameters of the equipment.

19. The method of claim 14 wherein:
the identified operation is a drilling process operation; and
the equipment includes a top drive and a drawworks.

20. The method of claim 19 wherein:
operating the equipment includes initiating, ramping up, or maintaining a rotating speed of the top drive; and
the change includes a change, relative to the identified drill process operation, to one or more parameters relating to the initiating, ramping up, or maintaining the rotating speed of the top drive, one or more commands to be issued to at least one of the one or more equipment controllers operable to control the top drive, or a combination thereof.

* * * * *